(12) United States Patent
Choi et al.

(10) Patent No.: US 10,750,195 B2
(45) Date of Patent: Aug. 18, 2020

(54) ELECTRONIC DEVICE AND METHOD FOR ENCODING IMAGE DATA THEREIN

(71) Applicant: Samsung Electronics Co., Ltd., Suwon-si, Gyeonggi-do (KR)

(72) Inventors: Jong-Bum Choi, Yongin-si (KR); A-Rang Lee, Suwon-si (KR); Hyung-Ju Chun, Hwaseong-si (KR); Sung-Oh Kim, Suwon-si (KR); Young-Jo Kim, Bucheon-si (KR); Hyun-Hee Park, Seoul (KR); Ha-Joong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/037,446

(22) Filed: Jul. 17, 2018

(65) Prior Publication Data

US 2019/0028722 A1   Jan. 24, 2019

(30) Foreign Application Priority Data

Jul. 21, 2017   (KR) .................. 10-2017-0092893

(51) Int. Cl.
*H04N 19/34* (2014.01)
*H04N 19/182* (2014.01)
(Continued)

(52) U.S. Cl.
CPC .......... *H04N 19/34* (2014.11); *G06T 3/4015* (2013.01); *H04N 1/413* (2013.01); *H04N 1/648* (2013.01);
(Continued)

(58) Field of Classification Search
CPC .. G06T 3/4015; H04N 19/103; H04N 19/119; H04N 19/146; H04N 19/182;
(Continued)

(56) References Cited

U.S. PATENT DOCUMENTS

| 8,179,971 B1 | 5/2012 | Gough et al. |
| 2001/0007595 A1 | 7/2001 | Mishima |

(Continued)

FOREIGN PATENT DOCUMENTS

| KR | 10-2003-0090376 A | 11/2003 |
| KR | 10-2010-00102493 A | 9/2010 |
| WO | 2015/055093 A1 | 4/2015 |

OTHER PUBLICATIONS

International Search Report dated Oct. 22, 2018, issued in International Application No. PCT/KR2018/008190.
(Continued)

*Primary Examiner* — Mohammed S Rahaman
(74) *Attorney, Agent, or Firm* — Jefferson IP Law, LLP

(57) ABSTRACT

The electronic device is provided. The electronic device includes a processor, and an image sensor module configured to be electrically connected to the processor, wherein the image sensor module comprises an image sensor configured to obtain raw image data and a control circuit configured to be electrically connected to the processor, and wherein the control circuit is configured to: generate a plurality of bit-planes configured based on bit positions of respective pixel values for a plurality of pixels corresponding to at least some of the raw image data obtained by the image sensor, generate compressed data in which one or more of the plurality of bit-planes are compressed, and transmit a bitstream containing the compressed data to the processor. Other embodiments may be provided.

16 Claims, 25 Drawing Sheets

(51) Int. Cl.
*H04N 19/186* (2014.01)
*H04N 19/119* (2014.01)
*H04N 1/413* (2006.01)
*H04N 19/146* (2014.01)
*H04N 19/103* (2014.01)
*G06T 3/40* (2006.01)
*H04N 19/93* (2014.01)
*H04N 1/64* (2006.01)

(52) U.S. Cl.
CPC ......... *H04N 19/103* (2014.11); *H04N 19/119* (2014.11); *H04N 19/146* (2014.11); *H04N 19/182* (2014.11); *H04N 19/186* (2014.11); *H04N 19/93* (2014.11)

(58) Field of Classification Search
CPC ...... H04N 19/186; H04N 19/34; H04N 19/93; H04N 1/413; H04N 1/648
See application file for complete search history.

(56) References Cited

U.S. PATENT DOCUMENTS

| | | | |
|---|---|---|---|
| 2003/0179938 A1* | 9/2003 | Van der Vleuten | H03M 7/30 382/232 |
| 2007/0189397 A1* | 8/2007 | Ngo | H04N 19/37 375/240.26 |
| 2010/0002943 A1* | 1/2010 | Moon | H04N 19/176 382/233 |
| 2010/0245635 A1 | 9/2010 | Lin | |
| 2010/0265392 A1* | 10/2010 | Shao | H04N 7/012 348/446 |
| 2011/0052052 A1* | 3/2011 | Hayashi | H04N 19/647 19/647 |
| 2012/0189215 A1* | 7/2012 | Deshpande | H04N 19/132 382/232 |
| 2012/0189223 A1* | 7/2012 | Fukuhara | H04N 19/149 382/248 |
| 2013/0127637 A1* | 5/2013 | Seroussi | H04W 52/0209 340/870.39 |
| 2015/0035984 A1* | 2/2015 | Otsuka | G08G 1/166 348/148 |
| 2015/0207974 A1 | 7/2015 | Mody et al. | |
| 2016/0234514 A1* | 8/2016 | Ju | H04N 19/176 |
| 2016/0323510 A1 | 11/2016 | Mobbs et al. | |

OTHER PUBLICATIONS

Schwartz et al., Bit-Plane Encoding: A Technique for Source Enconding, XP 011211512, IEEE Transactions on Aerospace and Electronic Systems vol. AES-2, No. 4, Jul. 1, 1966.
European Search Report dated Mar. 4, 2020, issued in European Patent Application No. 18835886.5.

* cited by examiner

ELECTRONIC DEVICE AND METHOD FOR ENCODING IMAGE DATA THEREIN

CROSS-REFERENCE TO RELATED APPLICATION(S)

This application is based on and claims the priority under 35 U.S.C. § 119(a) of Korean patent application number 10-2017-0092893, filed on Jul. 21, 2017, in the Korean Intellectual Property Office, the disclosure of which is incorporated herein by reference in its entirety.

BACKGROUND

1. Field

The disclosure relates to an electronic device for compressing image data obtained from an image sensor and a method for compressing image data in the electronic device.

2. Description of the Related Art

An electronic device, which processes an image, may acquire raw image data by means of an image sensor, and the acquired raw image data may be processed using an image signal processor (ISP) or the like.

The ISP may process the received raw image data using an image enhancement algorithm, thereby providing an image with improved quality. The ISP may execute various processes, such as white balance adjustment, color adjustment (e.g., color matrix, color correction, and color enhancement), color filter array interpolation, noise reduction processing, sharpening, image enhancement {e.g., high-dynamic-range (HDR) or face detection), and the like.

The image data output from the ISP may have, for example, a YUV format, or may be compressed and stored in the form of joint photographic experts group (JPEG).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide electronic device for effectively compressing raw image data photographed by an image sensor and transmitting the same to a processor and further provides a method for compressing image data in the electronic device.

Additional aspects will be set forth in part in the description which follows and, in part, will be apparent from the description, or may be learned by practice of the presented embodiments.

The raw image data obtained through the image sensor may be transmitted to a processor such as an image signal processor. Since the raw image data may be uncompressed data, a communication interface having a relatively high-rate transmission bandwidth (e.g., Gbps) may be used in order to transmit the high-resolution or high-capacity raw image data at a high frame rate.

In order to transmit the high-resolution or high-capacity raw image data to the processor, a high-performance interface is required, which causes problems such as an increase in the hardware cost, high power consumption, a high capacity of a memory, or the like.

In accordance with an aspect of the disclosure, an electronic device is provided. The electronic device includes a processor, and an image sensor module configured to be electrically connected to the processor, wherein the image sensor module includes an image sensor configured to obtain raw image data and a control circuit configured to be electrically connected to the processor, and wherein the control circuit is configured to: generate a plurality of bit-planes configured based on bit positions of respective pixel values for a plurality of pixels corresponding to at least some of the raw image data obtained by the image sensor, generate compressed data in which one or more of the plurality of bit-planes are compressed, and transmit a bitstream containing the compressed data to the processor.

In accordance with an aspect of the disclosure, a method of compressing image data in an electronic device is provided. The method includes obtaining raw image data from an image sensor, generating a plurality of bit-planes configured based on bit positions of respective pixel values for a plurality of pixels corresponding to at least some of the obtained raw image data, generating compressed data in which one or more of the plurality of bit-planes are compressed, and transmitting a bitstream containing the compressed data to a processor.

An electronic device and an image data compressing method, according to various embodiments, can effectively compress and transmit raw image data without degradation of the image quality when transmitting the raw image data photographed by an image sensor to a processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
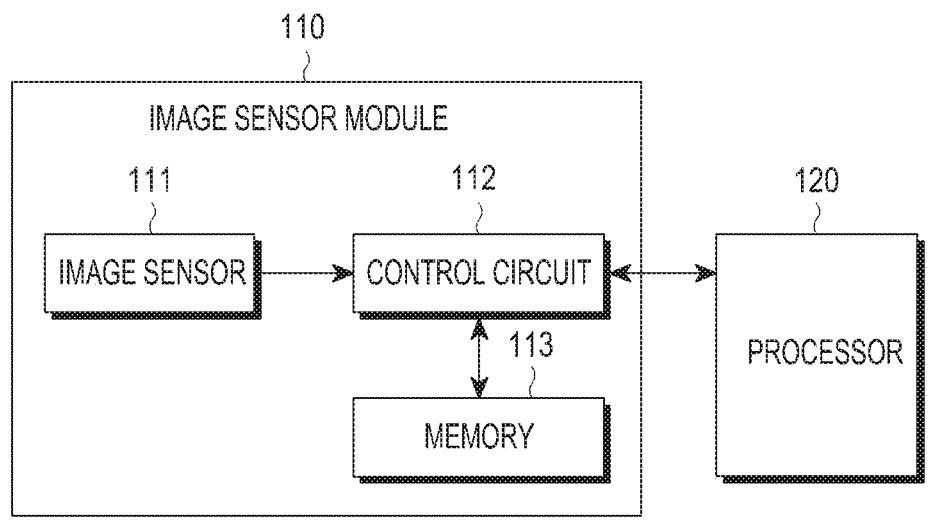
FIG. 1 is a view illustrating a configuration of an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expressions such as "first," "second," or the like used in various embodiments of the disclosure may modify various elements regardless of order or importance, and do not limit corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, terms defined in this specification may not be interpreted as excluding embodiments of the disclosure.

An electronic device according to various embodiments of the disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

In some embodiments, an electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the disclosure is not limited to the aforementioned devices, and may include a new electronic device according to the development of technology.

Various embodiments provide an electronic device capable of compressing and transmitting image data without degradation of image quality of image data or with minimum degradation of image quality when transmitting the image data obtained from an image sensor to an image signal processor, and further provide a method for compressing image data in the electronic device.

In various embodiments described below, image data obtained from an image sensor will be referred to as 'raw image data' for the convenience of explanation. The raw image data is not limited to a specific format of data and is interpreted as encompassing all of the data obtained from the image sensor, which has not yet been processed to a specific format of data. For example, according to various embodiments, the raw image data may have a variety of formats depending on the type, size, and shape of the image sensor. For example, the raw image data may include data on a plurality of pixels constituting a frame corresponding to a whole image, and pixel values for the respective pixels may be expressed and processed as a plurality of bits.

In various embodiments described below, a 'bit-plane' may be configured to include one or more bits, and when a pixel value for a specific pixel constituting image data is expressed as a bit value, respective bit-planes may correspond to respective positions (or digits) in the bit values. For example, when pixel values for the respective pixels are expressed as 10-bit data including the $0^{th}$ bit to the $9^{th}$ bit {most significant bit (MSB)}, bit-planes for the respective bit positions may be configured based on the data corresponding to the same bit position in the respective pixel values for a plurality of pixels. For example, if the pixel value is 10-bit data, a $0^{th}$ bit-plane corresponding to the $0^{th}$ bit, a $1^{st}$ bit-plane corresponding to the $1^{st}$ bit, . . . , and a $9^{th}$ bit-plane corresponding to the $9^{th}$ bit from the plurality of pixels. Hereinafter, an electronic device according to various embodiments will be described with reference to the accompanying drawings. In the specification, the term 'user' may refer to a person who uses an electronic device or to a device that uses an electronic device (e.g., an artificial intelligence electronic device).

FIG. 1 is a view illustrating a configuration of an electronic device according to various embodiments of the disclosure.

Referring to FIG. 1, the electronic device may be configured to include an image sensor module 110 and a processor 120. The image sensor module 110 may be electrically or communicatively connected to the processor 120. The image sensor module 110 and the processor 120 may be configured to be included in a single electronic device, or may be configured to be provided in separate electronic devices, respectively.

The image sensor module 110 may be configured to include at least one of an image sensor 111, a control circuit 112, and a memory 113. The control circuit 112 or the memory 113 may be configured inside the image sensor module 110 as shown in FIG. 1. Alternatively, the control circuit 112 or the memory 113 may be configured as a module separated from the image sensor module 110, or may be configured to be included in a separate module. The image sensor module 110 may constitute at least a part of a camera module provided in the electronic device, or may constitute at least a part of a camera as an electronic device.

According to various embodiments, the image sensor 111 may detect light incident on a sensor to thus acquire a value related to brightness or color for each pixel, but is not limited to a specific name of sensor, and thus any type of sensor capable of determining the brightness or color-related value of each pixel by the incident light can be the image sensor according to the embodiment. Hereinafter, the data obtained from the image sensor 111 will be referred to as 'raw image data' for the convenience of explanation.

The control circuit 112 may be configured to compress the raw image data obtained by the image sensor 111, according to various embodiments, and to transmit the compressed image data to the processor 120. Detailed examples of a method for compressing the raw image data in the control circuit 112, according to various embodiments, will be described later.

The memory 113 may store at least one of raw image data obtained by the image sensor 111, data generated in the process of compressing data by the control circuit 112, data compressed through the control circuit 112, data generated in the process of compressing the raw image data through the control circuit 112, or a bitstream including the compressed data to be transmitted to the processor 120. In FIG. 1, although the memory 113 is illustrated as being included in the image sensor module 110 for convenience, the memory 113 may be provided separately from the image sensor module 110, or may be provided in external electronic device connected via a wired or wireless communication network.

The image sensor module 110 and the processor 120 may be connected to each other by various wired/wireless communication interfaces. For example, according to various embodiments, the image sensor module 110 and the processor 120 may be connected to each other by a mobile industry processor interface (MIPI) line, and compressed data may be transmitted from the image sensor module 110 to the processor 120 through the MIPI line. According to various embodiments, the image sensor module 110 may transmit and receive various control signals to and from the processor 120 through a serial peripheral interface (SPI).

Figure 2:
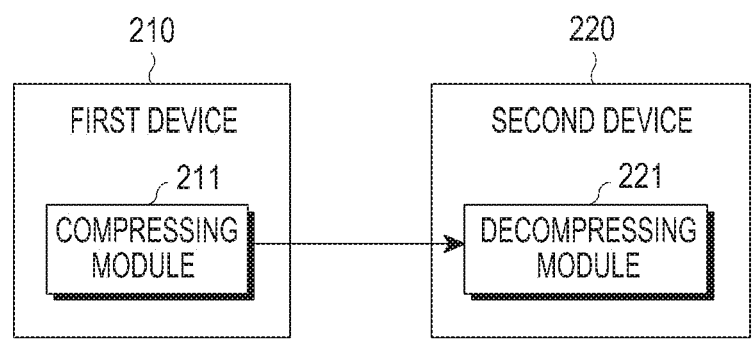
FIG. 2 is a view illustrating a configuration of a network according to various embodiments of the disclosure.

FIG. 2 is a view illustrating a configuration of a network according to various embodiments of the disclosure.

Referring to FIG. 2, an electronic device may include a first device 210 and a second device 220. The first device 210 may include a compressing module 211, and the second device 220 may include a decompressing module 221.

The compressing module 211 of the first device 210 may be configured to compress raw image data obtained from an image sensor according to various embodiments, and may include, at least in part, configurations included in the control circuit 112 in FIG. 1. The data compressed in the first device 210 may be transmitted to the second device 220 through various types of wired/wireless interfaces.

The decompressing module 221 of the second device 220 may decompress the compressed data transmitted from the first device 210 to correspond to a compressing scheme of the compressing module 211.

The first device 210 and the second device 220 may be configured as modules in a single electronic device, or may be configured to be included in different electronic devices, respectively.

In various embodiments, a function part or module may mean a functional and structural combination of hardware for performing the technical idea of various embodiments and software for driving the hardware. For example, those skilled in the art may readily understand that the function part or module may mean a logical unit of a predetermined code and a hardware resource for executing the predetermined code, and does not mean a code that is physically connected or a single type of hardware.

An electronic device, according to one of various embodiments, may include a processor; and an image sensor module configured to be electrically connected to the processor, wherein the image sensor module includes an image sensor configured to obtain raw image data and a control circuit configured to be electrically connected to the processor, and wherein the control circuit is configured to generate a plurality of bit-planes configured based on bit positions of respective pixel values for a plurality of pixels corresponding to at least some of the raw image data obtained by the image sensor; generate compressed data in which one or more of the plurality of bit-planes are compressed; and transmit a bitstream containing the generated compressed data to the processor.

According to various embodiments, the control circuit may be configured to separate the raw image data obtained from the image sensor into a plurality of color channels including a first color channel and a second color channel; and generate a first bit-plane corresponding to the first color channel and a second bit-plane corresponding to the second color channel, as part of the generating of the plurality of bit-planes.

According to various embodiments, the control circuit may be configured to convert at least some of the raw image data obtained from the image sensor into gray codes; and generate the plurality of bit-planes for the raw image data converted into the gray codes.

According to various embodiments, the control circuit may be configured to compress a specified number of bit-planes from the bit-planes corresponding to specified bits, among the plurality of bit-planes, based on at least a compression rate with respect to the raw image data, thereby generating the compressed data.

According to various embodiments, the control circuit may be configured to, based on a run-length method, perform compression for one or more bit-planes.

According to various embodiments, the control circuit may be configured to: as part of the generating of the plurality of bit-planes, based on the raw image data, determine a first partition including a plurality of color channels and a second partition including a plurality of color channels different from the plurality of color channels; generate a third bit-plane corresponding to the plurality of color channels included in the first partition; and generate a fourth bit-plane corresponding to the plurality of different color channels included in the second partition.

According to various embodiments, the bitstream may include an image header data field containing at least one piece of information related to the raw image data, a partition header field containing at least one piece of information related to a partition, or a compressed data field containing compressed data in which the bit-planes are compressed, and wherein the control circuit may be configured to transmit the bitstream to the processor such that the processor decompresses the compressed data using at least one of the image header data field, the partition header field, or the compressed data field.

According to various embodiments, the control circuit may be configured to, if the number of bit-planes selected based on at least a compression rate with respect to the raw image data, among the plurality of bit-planes, is less than a predetermined number, to add at least one bit to at least one pixel corresponding to the bit-plane and to transmit the same.

According to various embodiments, the control circuit may be configured to: divide the raw image data into a plurality of partitions corresponding to a plurality of pixels, respectively; generate the bit-plane using data corresponding to the plurality of pixels included in each partition; divide the respective partitions into a plurality of sub-partitions; determine the number of times the bit-run is interrupted in the bit-planes of each sub-partition; and if the number of times the bit-run is interrupted exceeds a specified number, add at least one bit to at least one pixel corresponding to the sub-partition and then transmit the same.

According to various embodiments, the control circuit may be configured to add at least one bit to a pixel the pixel value of which is equal to or less than a specific value, among the plurality of pixels, and to transmit the same.

Figure 3:
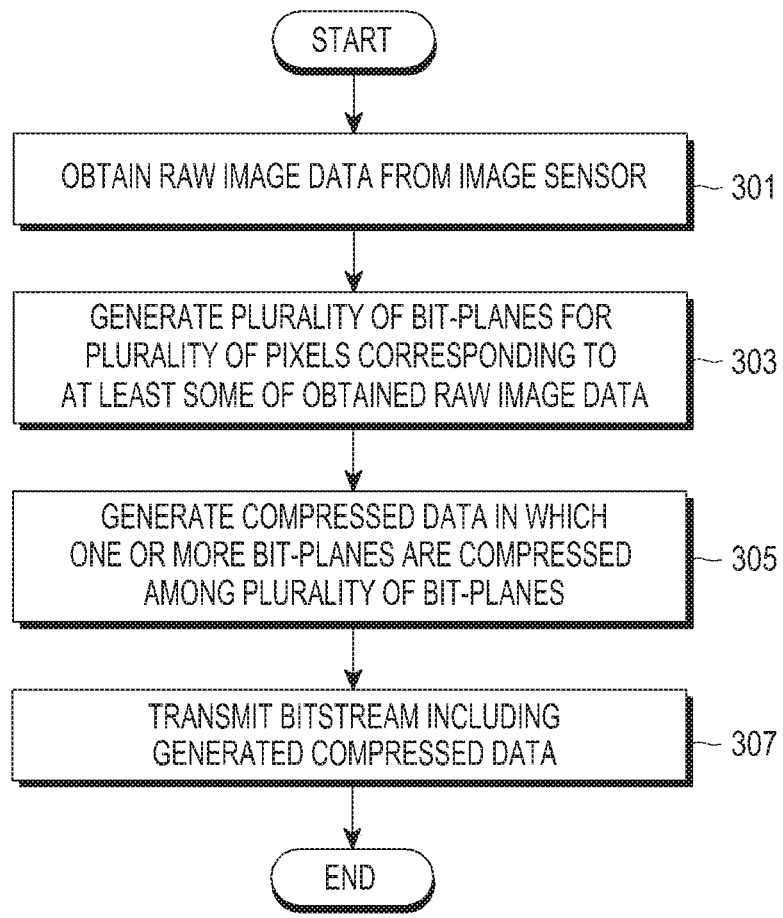
FIG. 3 is a flowchart illustrating a procedure for compressing image data in an electronic device according to various embodiments of the disclosure.

FIG. 3 is a flowchart illustrating a procedure for compressing image data in an electronic device according to various embodiments of the disclosure.

Referring to FIG. 3, the electronic device (e.g., the image sensor module 110 in FIG. 1 or the compressing module 211 in FIG. 2) may compress raw image data, which is image data obtained by an image sensor, and may transmit the compressed data to a processor according to various embodiments.

In operation 301, the electronic device may obtain the raw image data from the image sensor. According to various embodiments, the electronic device may separate the obtained raw image data into a plurality of color channels. For example, the electronic device may separate the obtained raw image data into the first channel data corresponding to the first color and the second channel data corresponding to the second color. The first color or the second color may include a color in visible light, or may include an infrared ray (IR) according to various embodiments. According to various embodiments, the electronic device may convert at least some of the data corresponding to at least one of a plurality of color channels into a gray code.

In operation 303, the electronic device may generate a plurality of bit-planes for a plurality of pixels (or gray code-converted pixels) corresponding to at least some of the obtained raw image data. For example, the electronic device may generate bit-planes corresponding to respective bit positions using data of the same bit position of each pixel value.

In operation 305, the electronic device may generate compressed data in which one or more of the plurality of bit-planes are compressed. According to various embodiments, the bit-plane compressing method may be applied differently to the respective bit-planes. According to various embodiments, only some of the plurality of bit-planes may be compressed in consideration of a predetermined compression rate.

At operation 307, the electronic device may transmit a bitstream containing the generated compressed data to the processor.

More detailed embodiments for compressing the raw image data in the electronic device will be described later.

Figure 4:
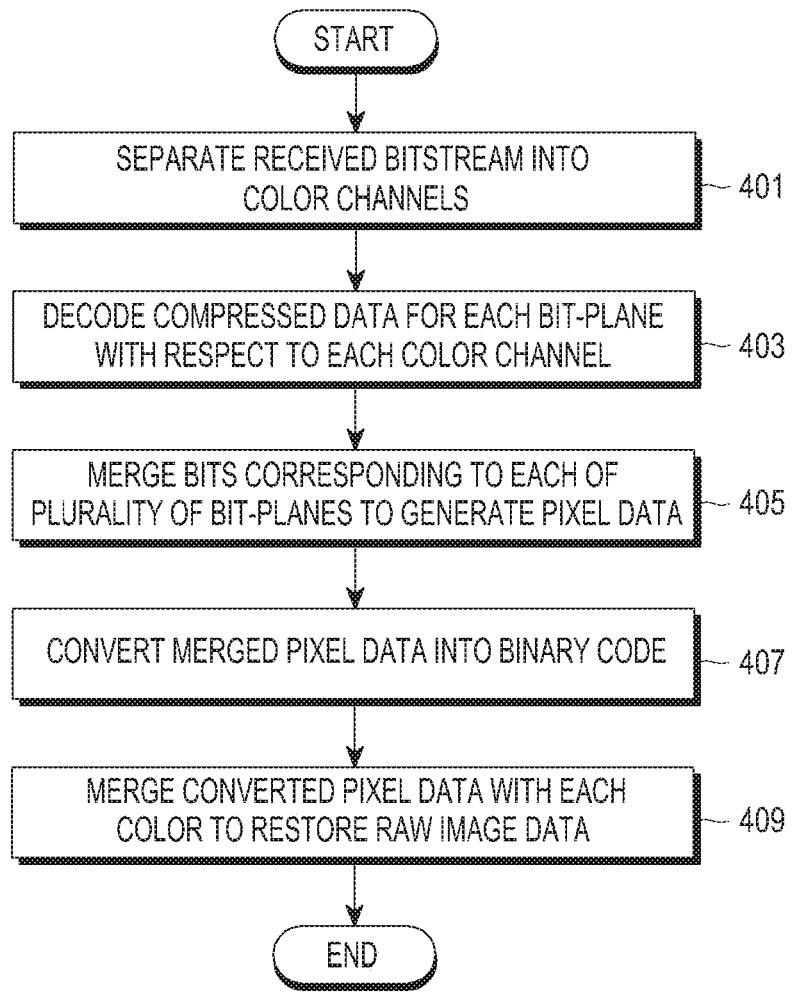
FIG. 4 is a flowchart illustrating a procedure for restoring compressed image data in an electronic device according to various embodiments of the disclosure.

FIG. 4 is a flowchart illustrating a procedure for restoring compressed image data in an electronic device according to various embodiments of the disclosure.

Referring to FIG. 4, the electronic device (e.g., the processor 120 in FIG. 1 or the decompressing module 221 in FIG. 2) may receive compressed data in the form of a bitstream, which is transmitted from the image sensor module, and may restore or decompress the received compressed data to correspond to a compressed scheme.

In operation 401, the electronic device may receive a bitstream including compressed data, and may separate the received bitstream into respective color channels.

In operation 403, the electronic device may decode the compressed data of the respective color channels for each bitstream. If different methods of compressing or encrypting the bit-plane are applied to the respective bit-planes according to various embodiments, methods of decoding the bit-planes may also be different between the respective bit-planes.

In operation 405, the electronic device may generate pixel data by merging the bits corresponding to the respective bit-planes, among a plurality of decoded bit-planes. In operation 407, the electronic device may convert the merged pixel data from a gray code to a binary code.

In operation 409, the electronic device may merge pixel data on a plurality of colors with each piece of the pixel data converted to the binary code, thereby restoring the raw image data.

More detailed embodiments for restoring the compressed image data in the electronic device will be described later.

According to various embodiments, at least one of the operations shown in FIGS. 3 and 4 may be omitted, or one or more other operations may be interposed between the operations. In addition, the operations in FIGS. 3 and 4 may be executed in the order shown in the drawings, or the execution of at least one operation may be changed with that of another operation as to sequence. In addition, the operations shown in FIGS. 3 and 4 may be executed in an electronic device or in a server. Alternatively, at least one of the operations shown in FIGS. 3 and 4 may be executed in an electronic device, and the remaining operations may be executed in a server.

A method of compressing image data in an electronic device, according to various embodiments, may include: obtaining raw image data from an image sensor; generating a plurality of bit-planes configured based on bit positions of respective pixel values for a plurality of pixels corresponding to at least some of the obtained raw image data; generating compressed data in which one or more of the plurality of bit-planes are compressed; and transmitting a bitstream containing the generated compressed data to a processor.

According to various embodiments, the method may further include: separating the raw image data obtained from the image sensor into a plurality of color channels including a first color channel and a second color channel; and generating a first bit-plane corresponding to the first color channel and a second bit-plane corresponding to the second color channel, as part of the generating of the plurality of bit-planes.

According to various embodiments, the method may further include: converting at least some of the raw image data obtained from the image sensor into gray codes; and generating the plurality of bit-planes for the raw image data converted into the gray codes.

According to various embodiments, the generating of the compressed data may include compressing a specified number of bit-planes from the bit-planes corresponding to specified bits, among the plurality of bit-planes, based on at least a compression rate with respect to the raw image data, thereby generating the compressed data.

According to various embodiments, the generating of the compressed data may include, based on a run-length method, performing compression for one or more bit-planes.

According to various embodiments, the generating of the bit-planes may include: based on the raw image data, determining a first partition including a plurality of color channels and a second partition including a plurality of color channels different from the plurality of color channels; generating a third bit-plane corresponding to the plurality of color channels included in the first partition; and generating a fourth bit-plane corresponding to the plurality of different color channels included in the second partition.

According to various embodiments, the bitstream may include an image header data field containing at least one piece of information related to the raw image data, a partition header field containing at least one piece of information related to a partition, or a compressed data field containing compressed data in which the bit-planes are compressed, and wherein the transmitting may further include transmitting the bitstream to the processor so as to decompress the compressed data using at least one of the image header data field, the partition header field, or the compressed data field.

According to various embodiments, the method may further include, if the number of bit-planes selected based on at least a compression rate with respect to the raw image data, among the plurality of bit-planes, is less than a predetermined number, adding at least one bit to at least one pixel corresponding to the bit-plane and transmitting the same.

According to various embodiments, the method may further include: dividing the raw image data into a plurality of partitions each including a plurality of pixels; generating the bit-plane using data corresponding to the plurality of pixels included in each partition; dividing the respective partitions into a plurality of sub-partitions; determining the number of times the bit-run is interrupted in the bit-planes of each sub-partition; and if the number of times the bit-run is interrupted exceeds a specified number, adding at least one bit to at least one pixel corresponding to the sub-partition and then transmitting the same.

According to various embodiments, the method may further include adding at least one bit to a pixel the pixel value of which is equal to or less than a specific value, among the plurality of pixels, and transmitting the same.

Hereinafter, various embodiments of a device and method for compressing and transmitting raw image data and for restoring the transmitted data, in an electronic device according to various embodiments, will be described in detail with reference to FIGS. 5 to 19.

Figure 5:
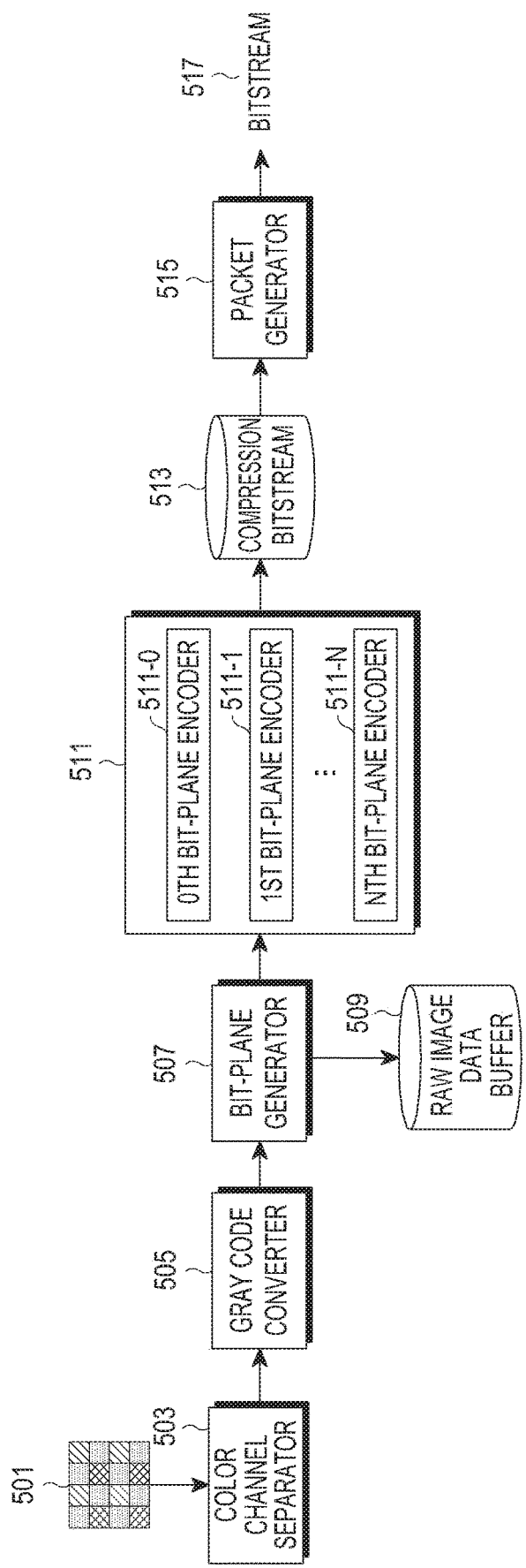
FIG. 5 is a block diagram illustrating a detailed structure of an electronic device for compressing image data according to various embodiments of the disclosure.

FIG. 5 is a block diagram illustrating a detailed structure of an electronic device for compressing image data according to various embodiments of the disclosure.

Referring to FIG. 5, the electronic device (e.g., the image sensor module 110 in FIG. 1 or the compressing module 211 in FIG. 2) for compressing image data, according to various embodiments, may include at least one of a color channel separator 503, a gray code converter 505, a bit-plane generator 507, a raw image data buffer 509, bit-plane encoders 511, a compression bitstream buffer 513, and a packet generator 515. According to various embodiments, the buffers (e.g., the raw image data buffer 509, the compression bitstream buffer 513, or the like) and various buffers, which will be described later, may be replaced by various forms of storages such as memories, databases, or the like.

According to various embodiments, raw image data 501 obtained by an image sensor may be Bayer image data as shown in the drawing. In the various embodiments described below, the Bayer image data will be described as an example of the raw image data 501 in order to facilitate understanding of the disclosure. However, according to various embodiments, the type of the raw image data 501 is not limited to the Bayer image data, but may include various types of image data (e.g., Foveon image data).

The color channel separator 503 may separate the respective pixels constituting the Bayer image data by colors to thus reconfigure the same. For example, since the respective pixels constituting the Bayer image data have colors of R, $G_1$, $G_2$, and B, the color channel separator 503 may separate the respective pixels constituting the raw image data for each color. For example, since the Bayer image data output from the image sensor has only one color channel per pixel, the correlation between adjacent pixels may be lowered. According to various embodiments, the correlation between consecutive data may be increased by separating the respective pixels into the same color channels through the color channel separator 503. For example, the color channel separator 503 may separate the obtained raw image data into the first channel data corresponding to the first color and the second channel data corresponding to the second color. The first color or the second color may include a color of a visible light, and may include an IR according to various embodiments.

The gray code converter 505 may convert binary data for pixel data of each color channel separated by the color channel separator 503 into gray code data.

The bit-plane generator 507, based on the bit positions of respective pixel values for a plurality of pixels corresponding to at least some of the raw image data converted into the gray code data, may generate a plurality of bit-planes. For example, if pixel values for the respective pixels are represented by binary numbers to have a total of 10 digit values from 0 to 9, the bit-plane generator 507, based on a bit value of the same digit for each pixel, may generate 10 bit-planes. According to various embodiments, the number of pixels for generating the bit-plane may be variously set. In various embodiments, a group of pixels that generate one bit-plane will be referred to as a 'partition' in order to facilitate understanding. According to various embodiments, the whole image data may be divided into a plurality of partitions having the same size or different sizes.

The bit-plane generator 507 may store data generated in the unit of a bit-plane, which has not yet been compressed, in the raw image data buffer 509. According to various embodiments, the uncompressed data stored in the raw image data buffer 509 may be compared with compressed data later to thus determine whether or not a predetermined compression rate is satisfied. If the compressed data does not satisfy a predetermined compression rate as a result of the above determination, it may be implemented such that only some bit-planes are transmitted. According to various embodiments, if the size of data obtained by compressing the bit-planes is greater than the size of uncompressed data, there is no compression effect. Therefore, it may be implemented such that the uncompressed bit-planes stored in the raw image data buffer 509 are transmitted. A plurality of bit-planes generated by the bit-plane generator 507 may be compressed for each bit-plane through bit-plane encoders 511.

The bit-plane encoders 511 may receive a plurality of bit-planes from the bit-plane generator 507, and may perform compression for each bit-plane. For example, the bit-plane encoders 511 may include (N+1) bit-plane encoders including the $0^{th}$ bit-plane encoder 511-0 to the $N^{th}$ bit-plane encoder 511-N according to the number of bit-planes. The $0^{th}$ bit-plane encoder 511-0 to the $N^{th}$ bit-plane encoder 511-N may perform encoding by the same algorithm or by different algorithms. According to various embodiments, the $0^{th}$ bit-plane encoder 511-0 to the $N^{th}$ bit-plane encoder 511-N may be configured to encode the bit-plane by an algorithm with the best compression efficiency in consideration of the distribution of bit values constituting a corresponding bit-plane. A more detailed description thereof will be provided later.

The bit-planes compressed through the bit-plane encoders 511 may be stored in the compression bitstream buffer 513. According to various embodiments, the packet generator 515 may compare the compressed bit-plane data stored in the compression bitstream buffer 513 and the uncompressed bit-plane data stored in the raw image data buffer 509 to thus determine a compression rate. According to various embodiments, the packet generator 515 may select only a specific number of bit-planes conforming to a predetermined compression rate, among a plurality of compressed bit-planes stored in the compression bitstream buffer 513, thereby generating a packet. According to various embodiments, when selecting a specific number of bit-planes for packet generation, a bit-plane corresponding to the MSB may be selected first.

According to various embodiments, if the compressed bit-plane satisfies a predetermined condition, or if a pixel value for each pixel satisfies a predetermined condition, the packet generator 515 may configure a packet by adding one or more bits in order to prevent degradation of image quality due to compression of the raw image data, and may transmit the packet in the form of a bitstream 517. For example, the added bits may be stored in a refinement bitstream buffer. According to various embodiments, the packet generator 515 may generate the packet so as to further include information on the raw image data, information related to the partition, and the like, in addition to the information on the compressed bit-planes. Embodiments of functions of the respective blocks in FIG. 5 will be described in detail later.

Figure 6:
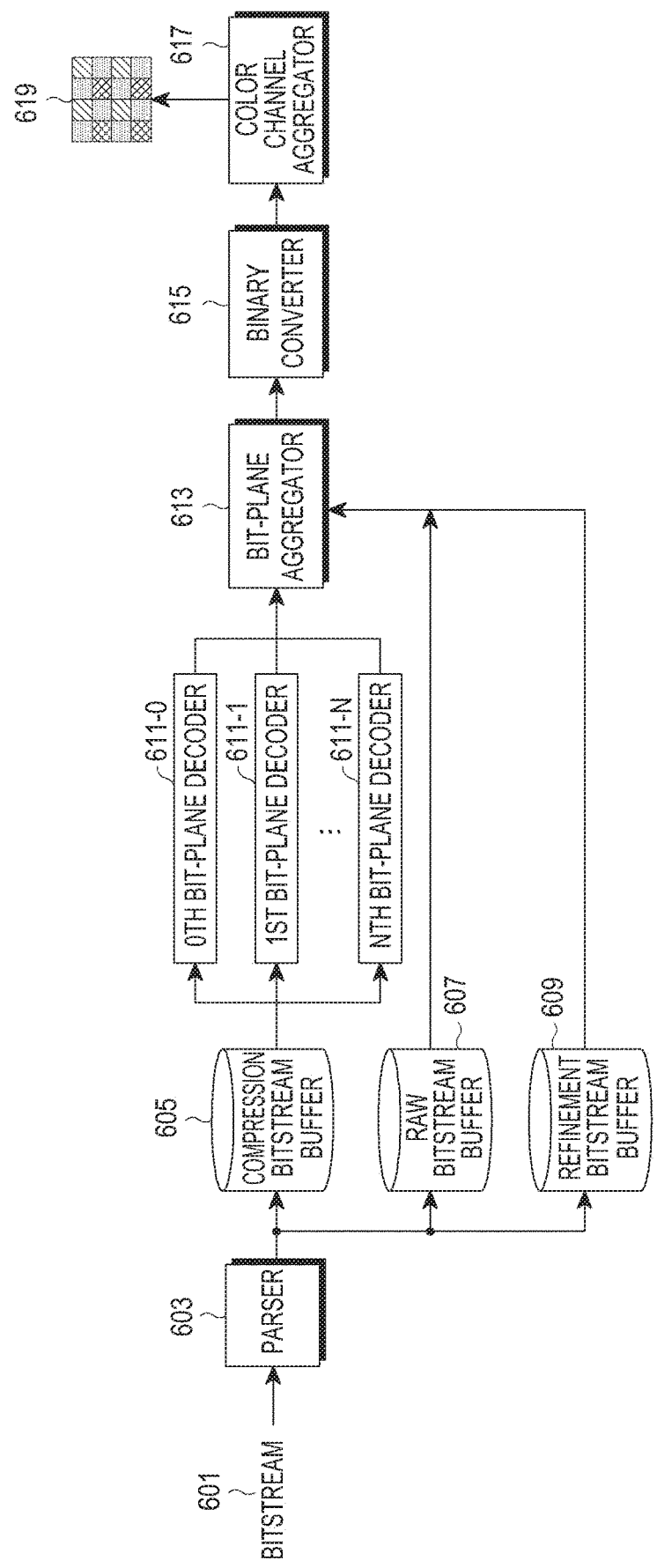
FIG. 6 is a block diagram illustrating a detailed structure of an electronic device for restoring compressed image data according to various embodiments of the disclosure.

FIG. 6 is a block diagram illustrating a detailed structure of an electronic device for restoring compressed image data according to various embodiments of the disclosure.

Referring to FIG. 6, the electronic device (e.g., the processor 120 in FIG. 1 or the decompressing module 221 in FIG. 2) for restoring or decompressing image data, according to various embodiments, may include at least one of a parser 603, a compression bitstream buffer 605, a raw image data buffer 607, a refinement bitstream buffer 609, bit-plane decoders 611, a bit-plane aggregator 613, a binary converter 615, and a color channel aggregator 617. Respective blocks in FIG. 6 may process data in the reverse order of the processing by the respective blocks in FIG. 5 so as to correspond thereto, according to various embodiments.

According to various embodiments, when a bitstream 601 containing compressed data is received, the parser 603 may identify header information of the received bitstream 601, and may separate and process the bitstream 601 for each color channel. According to various embodiments, the parser 603 may analyze the received bitstream 601, thereby storing a compressed bitstream in the compression bitstream buffer 605, storing an uncompressed bitstream in the raw image data buffer 607, and storing refinement bitstream data in the refinement bitstream buffer 609.

The compressed bitstreams stored in the compression bitstream buffer 605 may be provided to the bit-plane decoders 611 for each bit-plane. The bit-plane decoders 611 may receive the compressed bitstreams from the compression bitstream buffer 605, and may decompress or restore the same for each bit-plane. For example, the bit-plane decoders 611 may include (N+1) bit-plane decoders including the $0^{th}$ bit-plane decoder 611-0 to the $N^{th}$ bit-plane decoder 611-N according to the number of compressed bit-planes. According to various embodiments, if the number of compressed bit-planes is less than the total number of bit-planes, bit-plane decoders corresponding to the number of compressed bit-planes may be provided.

According to various embodiments, the respective bit-plane decoders 611-0 to 611-N may perform decoding by the same algorithm or by different algorithms. According to various embodiments, the respective bit-plane decoders 611-0 to 611-N may restore the compressed bit-planes so as to correspond to compressing schemes for the corresponding bit-planes. According to various embodiments, the compressing scheme for each bit-plane may be included in a specific data field of the received bitstream 601, and information on the respective bit-plane compressing schemes included in the received bitstream 601 may be provided to the respective bit-plane decoders 611 through the parser 603.

Based on the respective bit-planes decompressed through the bit-plane decoders 611, the raw image data stored in the raw-image data buffer 607, and the information on the added bits stored in the refinement bitstream buffer 609, the bit-plane aggregator 613 may reconfigure the bit-plane as the pixel data before being converted to the bit-plane.

According to various embodiments, since the pixel data converted from the bit-plane data is gray code-type data, the binary converter 615 may convert the gray code-type pixel data into binary code pixel data.

Since the pixel data converted into the binary code by the binary converter 615 is connected for each color, the color channel aggregator 617, according to various embodiments, may reconfigure the respective color channels as a pixel array of the raw image data (e.g., a pixel array of Bayer image data), thereby generating the raw image data 619.

Figure 7:
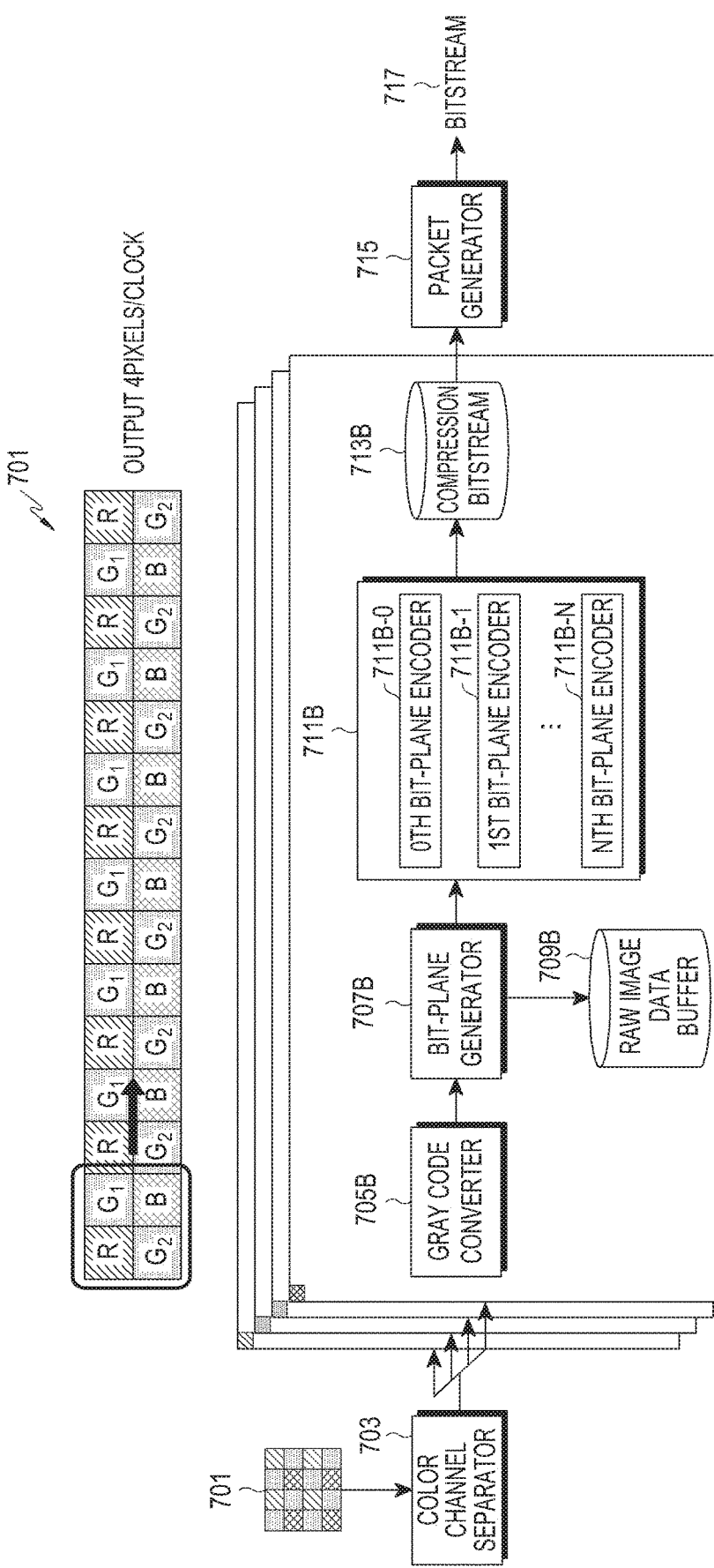
FIG. 7 is a block diagram illustrating a detailed structure of an electronic device for compressing image data according to various embodiments of the disclosure.

FIG. 7 is a block diagram illustrating a detailed structure of an electronic device for compressing image data according to various embodiments of the disclosure.

Referring to FIG. 7, an electronic device (e.g., the image sensor module 110 in FIG. 1 or the compressing module 211 in FIG. 2) for compressing image data, according to various embodiments, may include at least one of a color channel separator 703, a gray code converter 705, a bit-plane generator 707, a raw image data buffer 709, bit-plane encoders 711, a compression bitstream buffer 713, and a packet generator 715.

According to various embodiments, the raw image data 701 obtained from an image sensor may be Bayer image data as shown in the drawing. For example, the Bayer image data may be configured to have an image data frame having an array pattern in which four pixels corresponding to a color channel of R in the upper left portion, a color channel of $G_1$ in the upper right portion, a color channel of $G_2$ in the lower left portion, and a color channel of B in the lower right portion, as shown in FIG. 7, are repeated.

When four pixels are input to the color channel separator 703 for one clock as shown in the embodiment of FIG. 7, it may be configured such that four pixels are separated for each clock to then be compressed for each color channel. For example, since the Bayer image data output from the image sensor has only one color channel per pixel, the correlation between adjacent pixels may be lowered. According to various embodiments, the correlation between consecutive data may be increased by separating the respective pixels into the same color channels through the color channel separator 703.

Hereinafter, a compressing method for the color channel B will be described, and the remaining color channels R, $G_1$, and $G_2$ may be compressed in the same manner.

The gray code converter 705B for the color channel B may convert the binary data for the pixel data corresponding to the color B separated by the color channel separator 703 into gray code data.

Based on the bit positions of respective pixel values for pixels corresponding to the color channel B, among a plurality of pixels corresponding to at least some of the raw image data converted to the gray code data, the bit-plane generator 707B for the color channel B may generate a plurality of bit-planes. For example, when a pixel value for each pixel corresponding to the color channel B is represented by binary numbers to have a total of (N+1) digit values from 0 to N, (N+1) bit-planes may be generated based on a bit value of the same digit for each pixel. According to various embodiments, the number of pixels generating the bit-plane may be variously set. In various embodiments, a group of pixels that generate one bit-plane is referred to as a 'partition' in order to facilitate understanding. According to various embodiments, the whole image data may be divided into a plurality of partitions having the same size or different sizes.

The bit-plane generator 707B for the color channel B may store the uncompressed data generated for each bit-plane in the raw image data buffer 709B. According to various embodiments, the uncompressed data stored in the raw image data buffer 709B may be compared with compressed data later to thus determine whether or not a predetermined compression rate is satisfied. If the compressed data does not satisfy a predetermined compression rate as a result of the above determination, it may be implemented such that only some of the bit-planes are transmitted. According to various embodiments, if the size of data obtained by compressing the bit-plane is greater than the size of uncompressed data, there is no compression effect. Therefore, it may be implemented such that the uncompressed bit-plane stored in the raw image data buffer 509 is transmitted. A plurality of bit-planes generated by the bit-plane generator 707B for the color channel B may be compressed for each bit-plane through bit-plane encoders 711B for the color channel B.

The bit-plane encoders 711B for the color channel B may receive a plurality of bit-planes of the color channel B from the bit-plane generator 707B, and may perform compression for each bit-plane. For example, the bit-plane encoders 711B may include (N+1) bit-plane encoders including the $0^{th}$ bit-plane encoder 711B-0 to the $N^{th}$ bit-plane encoder 711B-N according to the number of bit-planes. The respective bit-plane encoders 711B-0 to 711B-N may perform encoding by the same algorithm or by different algorithms. According to various embodiments, the respective bit-plane encoders 711B-0 to 711B-N may be configured to encode a bit-plane by an algorithm with the best compression efficiency in consideration of the distribution of bit values constituting the corresponding bit-planes. A more detailed description thereof will be provided later. The bit-planes compressed through the bit-plane encoders 711B of the color channel B may be stored in the compression bitstream buffer 713.

The packet generator 715 may combine and packetize the bit-planes (or bitstreams) compressed in the respective color channels (e.g., the color channels R, $G_1$, $G_2$, and B) and header information, thereby generating the bitstream 717.

According to various embodiments, the packet generator 715 may compare the compressed bit-plane data stored in the compression bitstream buffer 713B and the uncompressed bit-plane data stored in the raw image data buffer 709B to thus determine a compression rate. According to various embodiments, the packet generator 715 may select only a specific number of bit-planes to conform to a predetermined compression rate, among a plurality of compressed bit-planes stored in the compression bitstream buffer 713B, thereby generating the packet. According to various embodiments, when selecting a specific number of bit-planes for packet generation, a bit-plane corresponding to the MSB may be selected first.

According to various embodiments, if the compressed bit-plane satisfies a predetermined condition, or if a pixel value for each pixel satisfies a predetermined condition, the packet generator 715 may configure a packet by adding one or more bits in order to prevent degradation of image quality due to compression of the raw image data. For example, the added bits may be stored in a refinement bitstream buffer. According to various embodiments, the packet generator 715 may generate the packet so as to further include information on the raw image data, information related to the partition, and the like, in addition to the information on the compressed bit-planes. Embodiments of functions in the respective blocks in FIG. 7 will be described in detail later.

Figure 8:
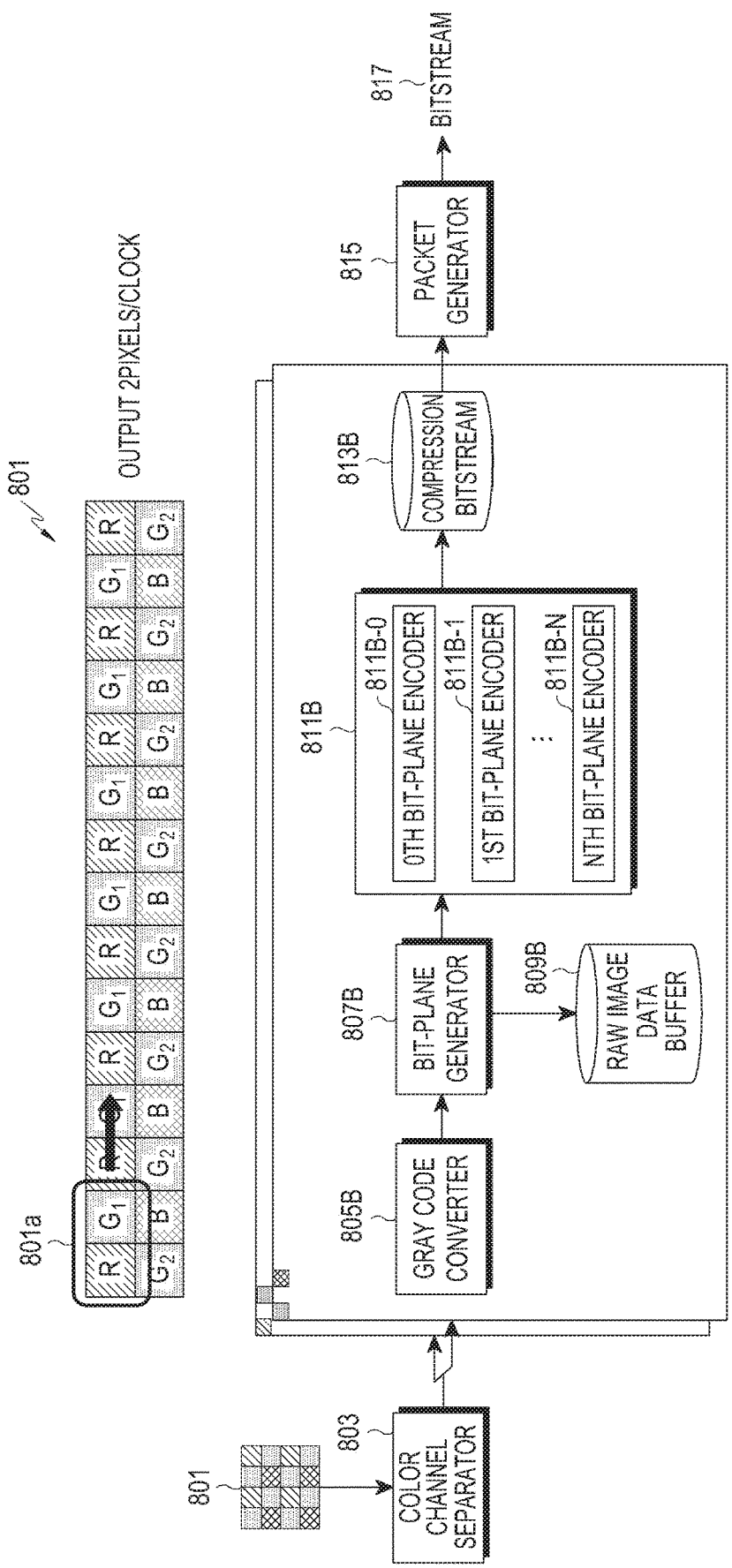
FIG. 8 is a block diagram illustrating a detailed structure of an electronic device for compressing image data according to various embodiments of the disclosure.

FIG. 8 is a block diagram illustrating a detailed structure of an electronic device for compressing image data according to various embodiments of the disclosure.

Referring to FIG. 8, the electronic device (e.g., the image sensor module 110 in FIG. 1 or the compressing module 211 in FIG. 2) for compressing image data, according to various embodiments, may include at least one of a color channel separator 803, a gray code converter 805, a bit-plane generator 807, the raw image data buffer 809, bit-plane encoders 811, a compression bitstream buffer 813, and a packet generator 815.

According to various embodiments, the raw image data 801 obtained from an image sensor may be Bayer image data as shown in the drawing. For example, the Bayer image data may be configured to have an image data frame having an array pattern in which four pixels corresponding to a color channel of R in the upper left portion, a color channel of $G_1$ in the upper right portion, a color channel of $G_2$ in the lower left portion, and a color channel of B in the lower right portion, as shown in FIG. 8, are repeated.

When two pixels 801a are input to the color channel separator 803 for one clock as shown in the embodiment of FIG. 8, it may be configured such that two pixels are separated for each clock to then be compressed for each color channel. For example, since the Bayer image data output from the image sensor has only one color channel per pixel, the correlation between adjacent pixels may be lowered. According to various embodiments, the correlation between consecutive data may be increased by separating the respective pixels into the same color channels through the color channel separator 803. For example, the color channel separator 803 may separate and process color channels of R and $G_1$ for a partition corresponding to a bit-plane, and then separate and process color channels of $G_2$ and B.

Hereinafter, a compressing method for the color channel B will be described, and the remaining color channels R, $G_1$, and $G_2$ may be compressed in the same manner.

The gray code converter 805B for the color channel B may convert the binary data for the pixel data corresponding to the color B separated by the color channel separator 803 into gray code data.

Based on the bit positions of respective pixel values for pixels corresponding to the color channel B, among a plurality of pixels corresponding to at least some of the raw image data converted to the gray code data, the bit-plane generator 807B for the color channel B may generate a plurality of bit-planes. For example, when a pixel value for each pixel corresponding to the color channel B is represented by binary numbers to have a total of (N+1) digit values from 0 to N, (N+1) bit-planes may be generated based on a bit value of the same digit for each pixel. According to various embodiments, the number of pixels generating the bit-plane may be variously set. In various embodiments, a group of pixels that generate one bit-plane is referred to as a 'partition' in order to facilitate understanding. According to various embodiments, the whole image data may be divided into a plurality of partitions having the same size or different sizes.

The bit-plane generator 807B for the color channel B may store the uncompressed data generated for each bit-plane in the raw image data buffer 809B. According to various embodiments, the uncompressed data stored in the raw image data buffer 809B may be compared with compressed data later to thus determine whether or not a predetermined compression rate is satisfied. If the compressed data does not satisfy a predetermined compression rate as a result of the above determination, it may be implemented such that only some of the bit-planes are transmitted. According to various embodiments, if the size of data obtained by compressing the bit-plane is greater than the size of uncompressed data, there is no compression effect. Therefore, it may be implemented such that the uncompressed bit-plane stored in the raw image data buffer 809B is transmitted. A plurality of bit-planes generated by the bit-plane generator 807B for the color channel B may be compressed for each bit-plane through bit-plane encoders 811B for the color channel B.

The bit-plane encoders 811B for the color channel B may receive a plurality of bit-planes of the color channel B from the bit-plane generator 807B, and may perform compression for each bit-plane. For example, the bit-plane encoders 811B for the color channel B may include (N+1) bit-plane encoders including the $0^{th}$ bit-plane encoder 811B-0 to the $N^{th}$ bit-plane encoder 811B-N according to the number of bit-planes. The respective bit-plane encoders 811B-0 to 811B-N may perform encoding by the same algorithm or by different algorithms. According to various embodiments, the respective bit-plane encoders 811B-0 to 811B-N may be configured to encode bit-planes by an algorithm with the best compression efficiency in consideration of the distribution of bit values constituting corresponding bit-planes. A more detailed description thereof will be provided later. The bit-planes compressed through the bit-plane encoders 811B of the color channel B may be stored in the compression bitstream buffer 813.

The packet generator 815 may combine and packetize the bit-planes (or bitstreams) compressed in the respective color channels (e.g., the color channels R, $G_1$, $G_2$, and B) and header information, thereby generating the bitstream 817. According to various embodiments, the packet generator 815 may compare the compressed bit-plane data stored in the compression bitstream buffer 813B and the uncompressed bit-plane data stored in the raw image data buffer 809B to thus determine a compression rate. According to various embodiments, the packet generator 815 may select only a specific number of bit-planes to conform to a predetermined compression rate, among a plurality of compressed bit-planes stored in the compression bitstream buffer 813B, thereby generating the packet. According to various embodiments, when selecting a specific number of bit-planes for packet generation, a bit-plane corresponding to the MSB may be selected first.

According to various embodiments, if the compressed bit-plane satisfies a predetermined condition, or if a pixel value for each pixel satisfies a predetermined condition, the packet generator 815 may configure a packet by adding one or more bits in order to prevent degradation of image quality due to compression of the raw image data. For example, the added bits may be stored in a refinement bitstream buffer. According to various embodiments, the packet generator 815 may generate the packet so as to further include information on the raw image data, information related to the partition, and the like, in addition to the information on the compressed bit-planes. Embodiments of functions in the respective blocks in FIG. 8 will be described in detail later.

Figure 9:
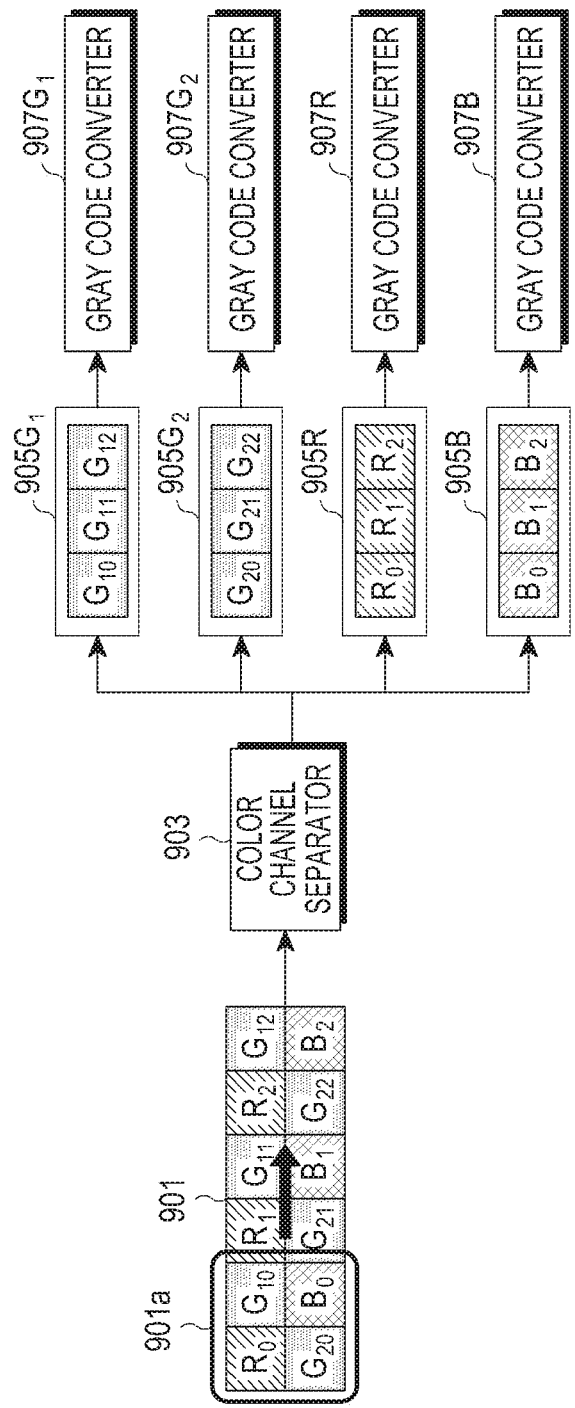
FIG. 9 is a view illustrating an example of separating color channels from image data according to various embodiments of the disclosure.

FIG. 9 is a view illustrating an example of separating color channels from image data according to various embodiments of the disclosure.

Referring to FIG. 9, the raw image data may be configured to an array pattern in which four pixels corresponding to a color channel of R in the upper left portion, a color channel of $G_1$ in the upper right portion, a color channel of $G_2$ in the lower left portion, and a color channel of B in the lower right portion, as shown in FIG. 7, are repeated.

When four pixels 901a from raw image data 901 are input to the color channel separator 903 (e.g., the color channel separator 503 in FIG. 5 or the color channel separator 703 in FIG. 7) for one clock as shown in FIG. 9, it may be configured such that four pixels are separated for each clock to then be compressed for each color channel. For example, since the Bayer image data output from the image sensor has only one color channel per pixel, the correlation between adjacent pixels may be lowered. According to various embodiments, the correlation between consecutive data may be increased by separating the respective pixels into the same color channels through the color channel separator 903.

According to various embodiments, pixel data simultaneously input for one clock may be separated for each color channel, and may then be transmitted to the gray code converter 907. For example, as shown in FIG. 9, when one partition includes data of three clocks as a unit for compression, the color channel separator 903 may configure, for three clocks, $G_1$-channel data 905$G_1$ using three pieces of pixel data $G_{10}$, $G_{11}$, and $G_{12}$, $G_2$-channel data 905$G_2$ using three pieces of pixel data $G_{20}$, $G_{21}$, and $G_{22}$, R-channel data 905R using three pieces of pixel data $R_0$, $R_1$, and $R_2$, and B-channel data 905B using three pieces of pixel data $B_0$, $B_1$, and $B_2$, respectively.

The pixel data separated for each channel may be transmitted to a gray code converter 907. For example, the $G_1$-channel data 905$G_1$ may be transmitted to a $G_1$-channel gray code converter 907$G_1$, the $G_2$-channel data 905$G_2$ may be transmitted to a $G_2$-channel gray code converter 907$G_2$, the R-channel data 905R may be transmitted to an R-channel gray code converter 907R, and the B-channel data 905B may be transmitted to a B-channel gray code converter 907B, respectively, for three clocks. The respective gray code converters 907$G_1$, 907$G_2$, 907R, and 907B may convert binary code data into gray code data for the pixel data separated for each channel.

Figure 10:
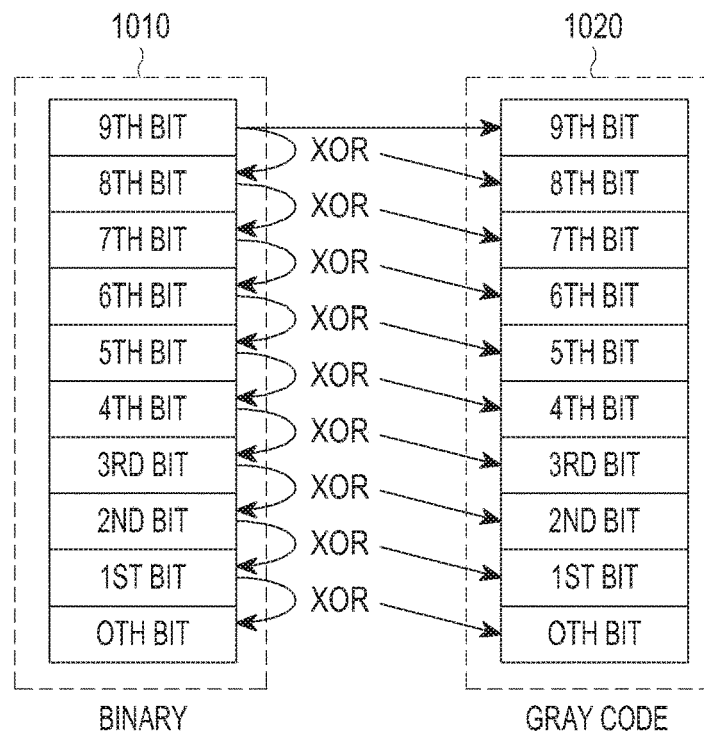
FIG. 10 is a view illustrating an example of converting binary data into gray code data according to various embodiments of the disclosure.

FIG. 10 is a view illustrating an example of converting binary data into gray code data according to various embodiments of the disclosure.

Referring to FIG. 10, binary code data 1010 may be converted into gray code data 1020 for the pixel data separated for each channel in FIG. 9 above. Although each pixel is illustrated as including 10 bits in total from the $0^{th}$ bit to the $9^{th}$ bit in FIG. 10, the various embodiments are not limited thereto.

Referring to FIG. 10, in order to convert the binary code data 1010 to the gray code data 1020, the remaining bits (e.g., the $8^{th}$ bit to the $0^{th}$ bit or the $8^{th}$ bit-plane to the $0^{th}$ bit-plane), except for the MSB (e.g., the $9^{th}$ bit or the $9^{th}$ bit-plane), may have an exclusive-OR operation with the upper bits (e.g., the $9^{th}$ bit to the $1^{st}$ bit), respectively, performed on them.

According to various embodiments, the results of the exclusive-OR operation may be transferred to a bit-plane encoder for compression. If the size of the compressed data is greater than the size of the input data before compression, the uncompressed data (e.g., bit-planes of the raw image data) may be stored in the raw image data buffer so as to be transmitted.

Figure 11:
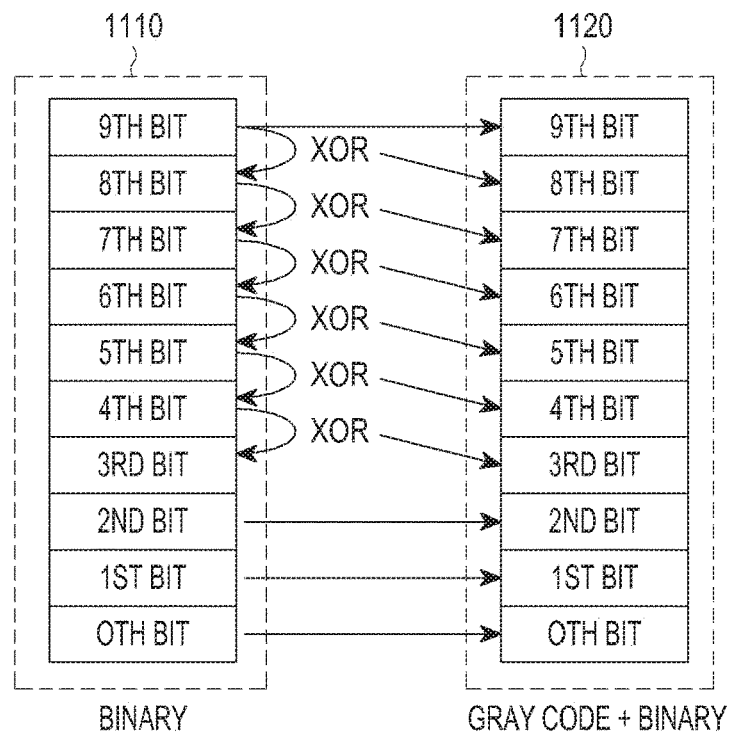
FIG. 11 is a view illustrating an example of converting binary data into gray code data according to various embodiments of the disclosure.

FIG. 11 is a view illustrating an example of converting binary data into gray code data according to various embodiments of the disclosure.

Referring to FIG. 11, binary code data 1110 may be converted into gray code data 1120 for the pixel data separated for each channel in FIG. 9 above. Although each pixel is illustrated as including 10 bits in total from the $0^{th}$ bit to the $9^{th}$ bit in FIG. 11, the various embodiments are not limited thereto.

Referring to FIG. 11, in order to convert the binary code data 1110 to the gray code data 1120, at least some bits (e.g., the $8^{th}$ bit to the $3^{rd}$ bit or the $8^{th}$ bit-plane to the $3^{rd}$ bit-plane) of the remaining bits, except for the MSB (e.g., the $9^{th}$ bit or the $9^{th}$ bit-plane), may have an exclusive-OR operation with the upper bits (e.g., the $9^{th}$ bit to the $4^{th}$ bit or the $9^{th}$ bit-plane to the $4^{th}$ bit-plane), respectively, performed on them.

According to various embodiments, the bit-plane encoder may not give a compression effect through the encoding after the gray code conversion in a specific bit-plane or below because of the influence of noise. Referring to FIG. 11, the gray code conversion may not be performed with respect to bits below a specific bit {e.g., the $2^{nd}$ bit (or the $2^{nd}$ bit-plane) and bits below the same) according to various embodiments. As shown in FIG. 11, when converting only some bits (or bit-planes), gray codes and binary codes may be mixed or merged.

According to various embodiments, the results of the gray code conversion may be transferred to a bit-plane encoder for compression. If the size of the compressed data is greater than the size of the input data before compression, the uncompressed data (e.g., bit-planes of the raw image data) may be stored in the raw image data buffer so as to be transmitted.

Figure 12:
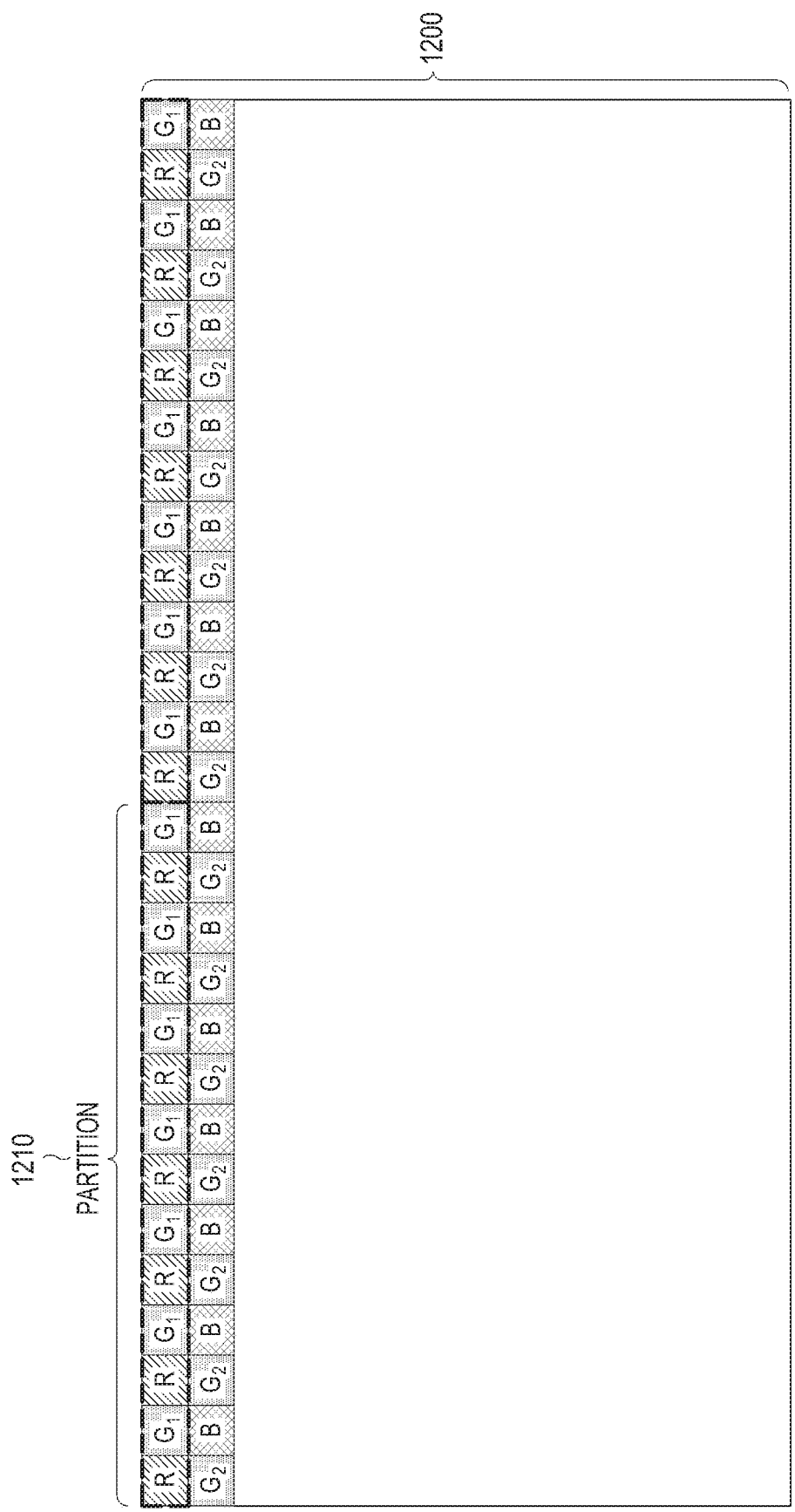
FIG. 12 is a view illustrating an example of partitioning raw image data according to various embodiments of the disclosure.

FIG. 12 is a view illustrating an example of partitioning raw image data according to various embodiments.

Referring to FIG. 12, compression of image data may be performed for all of the pixels according to various embodiments of the disclosure. Alternatively, as shown in FIG. 12, the entire image data 1200 may be divided into a plurality of partitions 1210, and bit-planes may be configured for each partition, thereby performing compression for each bit-plane.

For example, when four pixels are simultaneously input for one clock, seven pixels of R, $G_1$, $G_2$, and B may be configured as one partition 1210 to constitute a bit-plane. For example, according to various embodiments, bit-planes corresponding to respective bit positions of the respective color channels may be configured as data of 7 bits according to the number of 7 pixels. According to various embodiments, in the case where a pixel value of each pixel is configured as 10 bits as shown in FIGS. 10 and 11, during 7 clocks for processing one partition 1210, 10 bit-planes each including data of 7 bits may be generated for the color channel R, 10 bit-planes each including data of 7 bits may be generated for the color channel $G_1$, 10 bit-planes each including data of 7 bits may be generated for the color channel $G_2$, and 10 bit-planes each including data of 7 bits may be generated for the color channel B.

According to various embodiments, the partition may be a unit in which compression is performed, and the partition may include a plurality of pixels. According to various embodiments, the number of pixels constituting the respective partitions may be the same, or may be different, with respect to a whole image. According to various embodiments, information on the number of pixels constituting each partition may be added as header information, when the packet generator (e.g., the packet generator 515 in FIG. 5, the packet generator 715 in FIG. 7, or the packet generator 815 in FIG. 8) generates the packet data.

Figure 13:
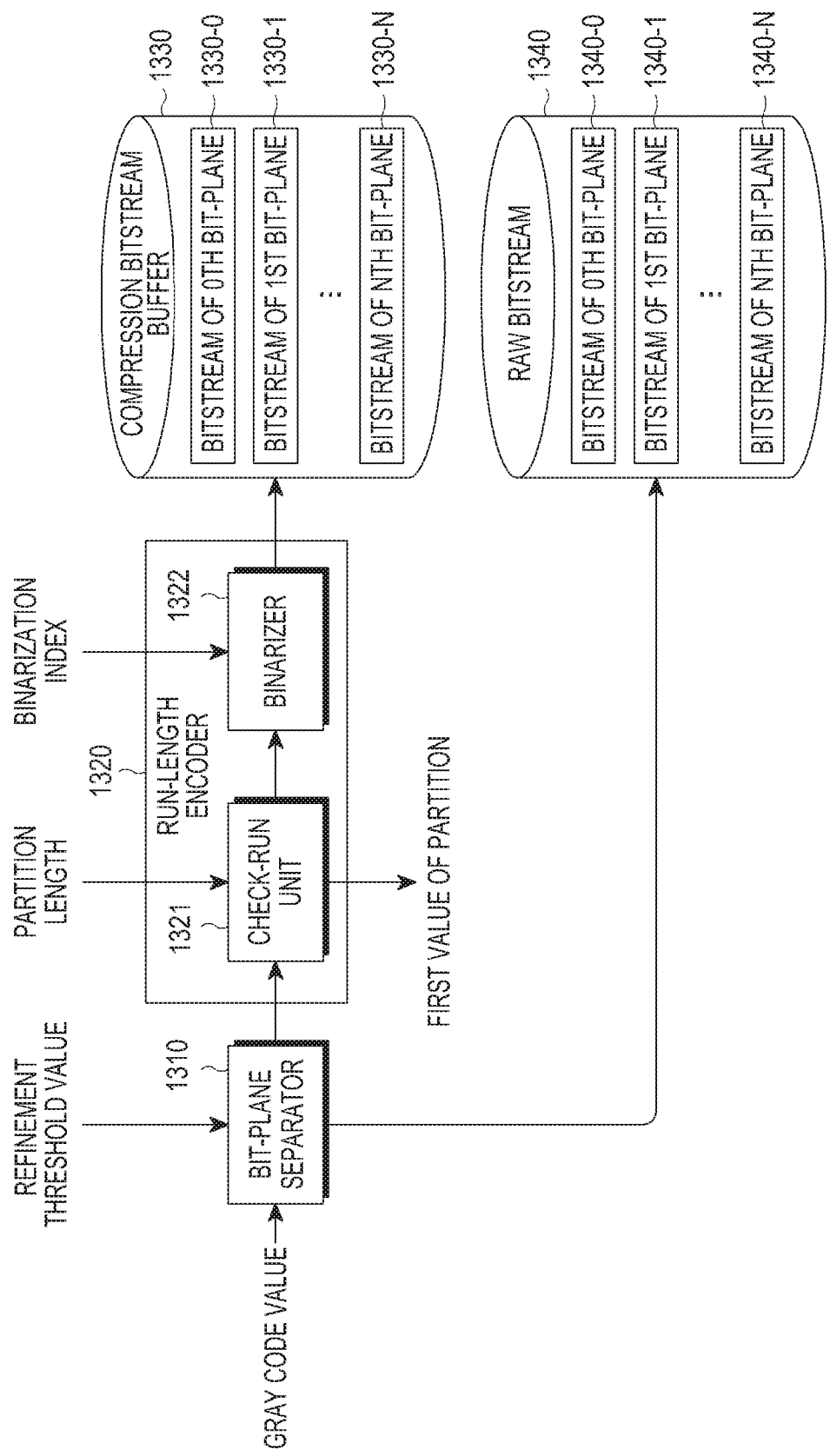
FIG. 13 is a view showing an example of compressing respective bit-planes according to various embodiments of the disclosure.

FIG. 13 is a view showing an example of compressing respective bit-planes according to various embodiments of the disclosure.

Referring to FIG. 13, a bit-plane encoder (e.g., the bit-plane encoder 511, 711, or 811 in FIG. 5, 7, or 8), according to various embodiments, may be configured as a run-length encoder 1320. According to various embodiments, the run-length encoder 1320 may be configured to include a check-run unit 1321 and a binarizer 1322.

According to various embodiments, a bit-plane separator 1310 may convert gray code-converted pixel data into bit-planes, and may transmit the respective bit-planes to the run-length encoder 1320. The bit-plane separator 1310 may store the gray code-converted raw image data, which has not yet been compressed, in a raw image data buffer 1340. The uncompressed data may be stored in the raw image data buffer 1340 in the unit of a bit-plane, such as a bitstream of the $0^{th}$ bit-plane 1340-0 to a bitstream of the $N^{th}$ bit-plane 1340-N.

The gray code-converted data may be transmitted to the check-run unit 1321 of the run-length encoder 1320 for each bit-plane through the bit-plane separator 1310. If the data input to the check-run unit 1321 is the first data of a corresponding partition, the value of the first data may be transferred to a packet generator for adding the same to the header information.

The check-run unit 1321 may compare input data subsequent to the first data with previous input data until it reaches the size of the corresponding partition to thus calculate a run-length value, and the calculated run-length value may be transmitted to the binarizer 1322.

The binarizer 1322 may perform a binarization operation with respect to the run-length value input from the check-run unit 1321 and a corresponding bit-plane with reference to an index indicating a method to be used for binarization thereof.

According to various embodiments, the binarization method performed by the binarizer 1322 may be selectively applied depending on the distribution possibility characteristics of a run-value, such as kth-order Exp-Golmb, Unary, Truncation Unary, Truncation Unary+kth-order Exp Golmb, Golmb rice, and the like, as illustrated in Tables 1 to 3.

TABLE 1

EG 0

| Prefix | Suffix | Value Range | Value Range | Num of bits |
|---|---|---|---|---|
| 0 | | 0 | 0 | One |
| 10 | X | 2 | 2 | 3 |
| 110 | XX | 4 | 6 | 5 |
| 1110 | XXX | 8 | 14 | 7 |
| 11110 | XXXX | 16 | 30 | 9 |
| 111110 | XXXXX | 32 | 62 | 11 |
| 1111110 | XXXXXX | 64 | 126 | 13 |
| 11111110 | XXXXXXX | 128 | 254 | 15 |
| 111111110 | XXXXXXXX | 256 | 510 | 17 |
| 1111111110 | XXXXXXXXX | 512 | 1022 | 19 |
| 11111111110 | XXXXXXXXXX | 1024 | 2046 | 21 |
| 111111111110 | XXXXXXXXXXX | 2048 | 4094 | 23 |
| 1111111111110 | XXXXXXXXXXXX | 4096 | 8190 | 25 |

TABLE 2

EG 2

| Prefix | Suffix | Value Range | Value Range | Num of bits |
|---|---|---|---|---|
| 0 | XX | 4 | 3 | 3 |
| 10 | XXX | 8 | 11 | 5 |
| 110 | XXXX | 16 | 27 | 7 |
| 1110 | XXXXX | 32 | 59 | 9 |
| 11110 | XXXXXX | 64 | 123 | 11 |
| 111110 | XXXXXXX | 128 | 251 | 13 |
| 1111110 | XXXXXXXX | 256 | 507 | 15 |
| 11111110 | XXXXXXXXX | 512 | 1019 | 17 |
| 111111110 | XXXXXXXXXX | 1024 | 2043 | 19 |
| 1111111110 | XXXXXXXXXXX | 2048 | 4091 | 21 |
| 11111111110 | XXXXXXXXXXXX | 4096 | 8187 | 23 |
| 111111111110 | XXXXXXXXXXXXX | 8192 | 16379 | 25 |
| 1111111111110 | XXXXXXXXXXXXXX | 19384 | 32763 | 27 |

TABLE 3

| Value | Bin String |
|---|---|
| 0 | 0 |
| 1 | 10 |
| 2 | 110 |
| 3 | 1110 |
| 4 | 1111 0 |
| 5 | 1111 100 |
| 6 | 1111 101 |

According to various embodiments, the packet generator may add the binarization method, which is to be applied to each bit-plane by the binarizer 1322, to header information to thus transmit the same.

According to various embodiments, among a plurality of bit-planes, pixel values in the same partition may be the same in a bit-plane adjacent to the MSB. In this case, since the corresponding bit-plane data has the same bit, information indicating that the bit-plane data has the same value may be included in the header information to then be transmitted, instead of transmitting run-length values.

According to various embodiments, the information indicating that the corresponding bit-plane data has the same value may be transmitted using a flag indicating whether or not all of the data has the same value for each bit-plane. According to various embodiments, the number of bit-planes having the same value may be represented based on the most significant bit-plane using a feature in which most of bit-planes having the same value start from the most significant bit-plane.

Figure 14:
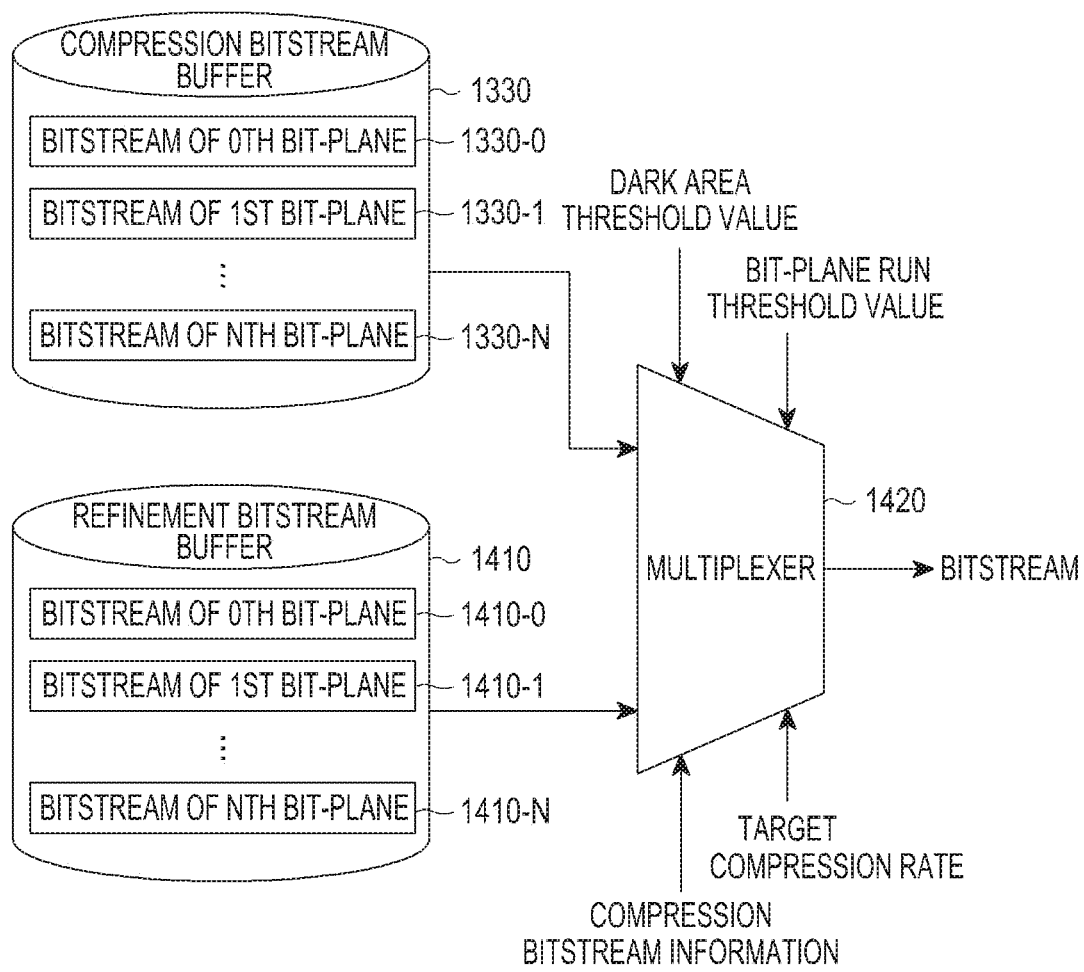
FIG. 14 is a view illustrating an example of generating a bitstream including a compressed bit-plane according to various embodiments of the disclosure.

FIG. 14 is a view illustrating an example of generating a bitstream including a compressed bit-plane according to various embodiments of the disclosure.

Referring to FIG. 14, the bit-planes compressed according to the embodiment of FIG. 13 may be multiplexed through a multiplexer 1420 (e.g., the packet generator 515, 715, or 815 in FIG. 5, 7, or 8) in the form of a packet, and may then be output as a bitstream.

The input data of the multiplexer 1420 may include at least one of the compression bitstreams (e.g., the bitstream of the $0^{th}$ bit-plane 1330-0 to the bitstream of the $N^{th}$ bit-plane 1330-N) stored in the compression bitstream buffer 1330 and refinement bitstreams (e.g., the bitstream of the $0^{th}$ bit-plane 1410-0 to the bitstream of the $N^{th}$ bit-plane 1410-N) stored in the refinement bitstream buffer 1410.

According to various embodiments, the multiplexer 1420 may receive the input data, and may generate a packet with reference to at least one of compressed bitstream information (e.g., compressed bitstream size or equal-value information) of each bit-plane, target compression rate information, a bit-plane cut threshold value (e.g., a first threshold value) required for configuring the refinement bitstream, a bit-plane run threshold value (e.g., a second threshold value) for determining image complexity, and a dark area threshold value (e.g., a third threshold value).

According to various embodiments, the multiplexer 1420 may receive, from each bit-plane encoder, the size of the compressed bitstream for each bit-plane in the unit of a partition and information indicating whether or not the respective bit-planes in the partition have the same value, and may determine the number of bit-planes to be discarded in order to attain a target compression rate.

According to various embodiments, after determining the number of bit-planes, the multiplexer 1420 may compare the size of the compressed data with the size of the raw image data before compression for each partition, and may select smaller data, thereby configuring a bitstream. According to various embodiments, a unit of configuring a bitstream in the multiplexer 1420 may be a partition, and each partition may include information related to the compression state of the partition.

According to various embodiments, the multiplexer 1420 may configure a compression data bitstream for each unit partition, and may determine a refinement data bitstream for improving image quality according to a predetermined condition. For example, according to various embodiments, the refinement data bitstream may be determined according to a condition shown in FIG. 15, which will be described later. According to various embodiments, when a refinement data bitstream is determined for image quality enhancement, at least one bit may be transmitted as an additional bit with respect to the bit-plane for each pixel or each unit partition.

According to various embodiments, if the position of a bit-plane (Lowest_Bit_Plane) discarded for attaining a target compression rate is greater than a lowest bit-plane threshold value (Lowest_Bit_Plane Threshold), excessive information loss may occur, thereby determining that there is a strong possibility of subjective quality degradation.

According to various embodiments, since the subjective quality degradation occurs mainly in a homogeneous area, the corresponding area may be identified, and an extension bit may be added as a refinement bitstream to then be transmitted. According to various embodiments, the partition may be divided into sub-partitions having a specific length, and the homogeneous area may be identified in the unit of a sub-partition. According to various embodiments, it may be determined that identifying the homogeneous area is complicated if the sum of the numbers of times the bit-run is interrupted in the upper bit-planes of the lowest bit-plane is greater than a bit-plane run threshold value.

According to various embodiments, even when the sub-partition is determined not to be homogeneous in the above operation, a refinement bit may be further transmitted for a pixel the pixel value of which is less than a specified value (e.g., a dark area threshold value).

Figure 15:
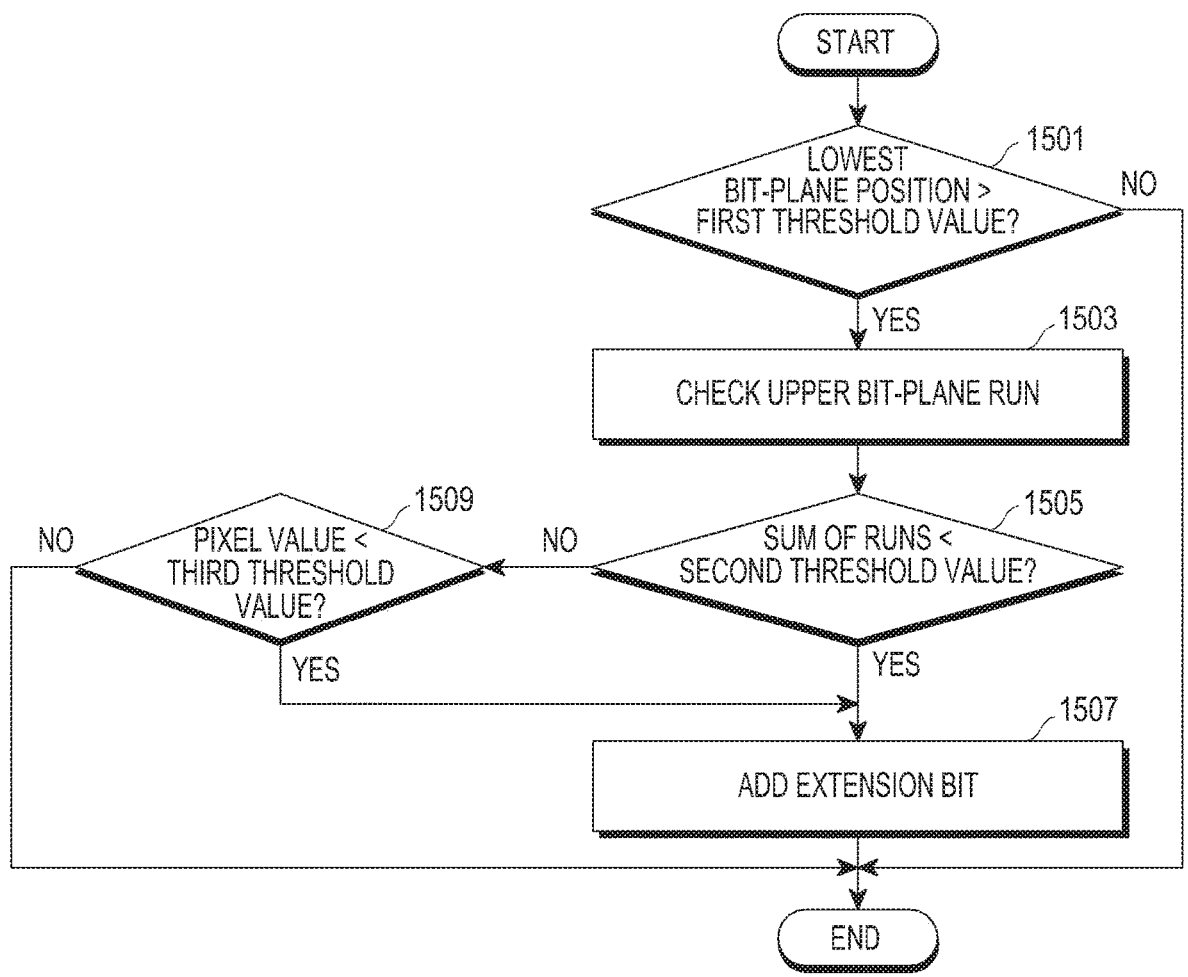
FIG. 15 is a flowchart illustrating a procedure of adding an extension bit to a bitstream according to various embodiments of the disclosure.

FIG. 15 is a flowchart illustrating a procedure of adding an extension bit to a bitstream according to various embodiments of the disclosure.

Referring to FIG. 15, if the lowest bit-plane position is greater than a first threshold value (e.g., the lowest bit-plane threshold value) in operation 1501, an electronic device (e.g., the image sensor module 110 or the control circuit 112 in FIG. 1, the compressing module 211 in FIG. 2, or the multiplexer 1420 in FIG. 14) may check bit-runs of a predetermined number of upper bit-planes in operation 1503.

If the sum of the numbers of the bit-runs (e.g., the numbers of bit changes) of the upper bit-planes is greater than a second threshold value (e.g., a bit-plane run threshold value) as a result of the checking in operation 1505, the electronic device may add at least one bit as an extension bit to thus form a packet in the corresponding sub-partition in operation 1507.

According to various embodiments, the subjective image quality degradation is normally perceptible in a dark area, which is homogeneous and the pixel value of which is less than a specific threshold value. For example, when a pixel value is smaller than a third threshold value (e.g., a dark area threshold value) input to the multiplexer 1420, the corresponding pixel may be determined as a dark area, and thus at least one bit may be added as an extension bit to then be transmitted.

If the sum of the numbers of the bit-runs of the upper bit-planes is not greater than the second threshold value as a result of the checking the bit-runs in operation 1505, the electronic device may compare the respective pixel values with the third threshold value in operation 1509. As a result of the comparison, if a pixel value of a specific pixel is smaller than the third threshold value, the corresponding pixel may be determined as a dark area, and an extended bit may be added in operation 1507.

Figure 16:
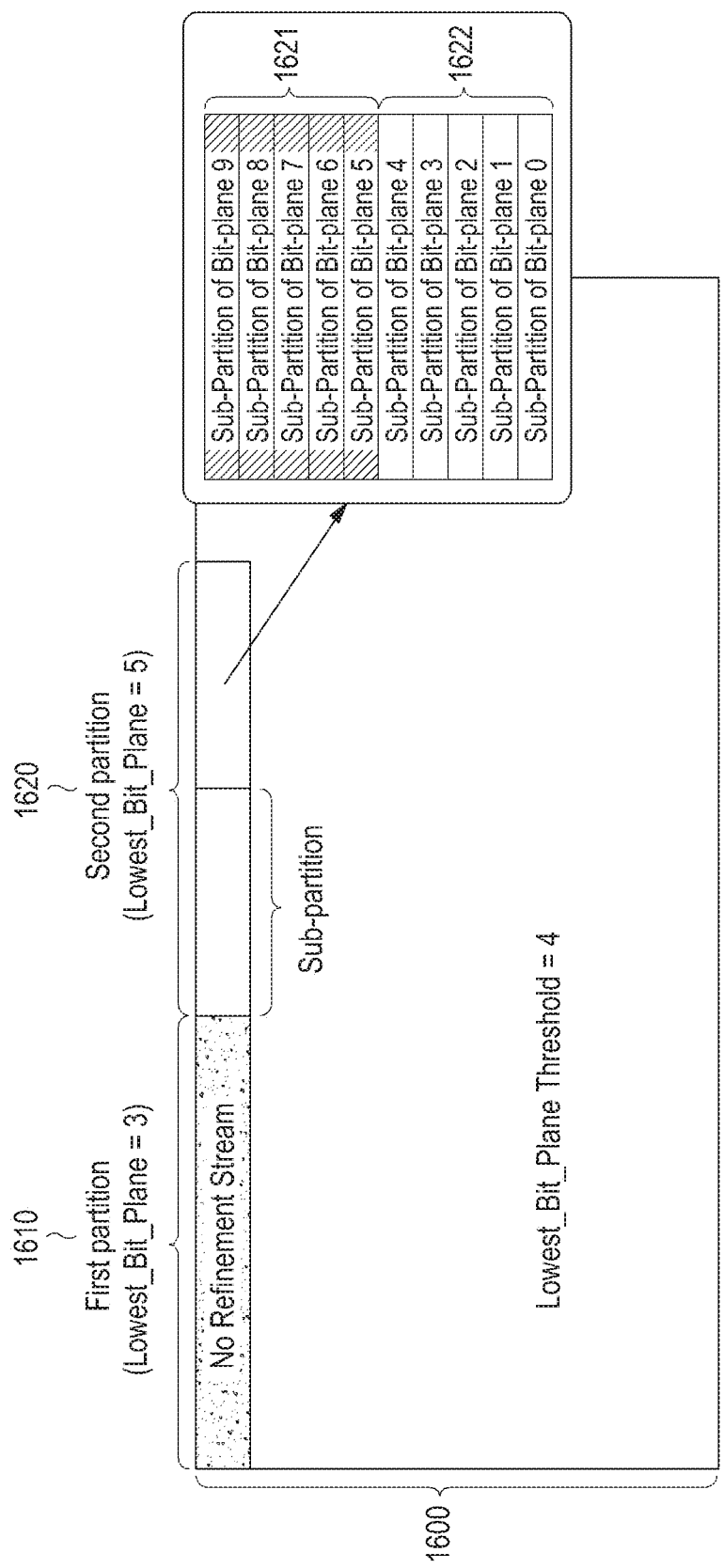
FIG. 16 is a view illustrating an example of separating image data into a plurality of partitions and sub-partitions according to various embodiments of the disclosure.

FIG. 16 is a view illustrating an example of separating image data into a plurality of partitions and sub-partitions according to various embodiments of the disclosure.

Referring to FIG. 16, the entire image data 1600 may be divided into a plurality of partitions 1610 and 1620, as an encoding processing unit, each of which includes a plurality of pixels.

According to various embodiments, the respective partitions may be divided into a plurality of sub-partitions for identifying an area for adding extension bits. For example, in FIG. 16, the second partition may be divided into two sub-partitions. At least some of a plurality of bit-planes configured in the divided sub-partitions may be selected and transmitted, and extension bits may be added and transmitted according to the above-described condition. According to various embodiments, in the second partition 1620, the bit-planes 5 to 9 may be selected and transmitted as compressed bit-planes 1621, and the bit-planes 0 to 4 (1622) may be discarded. For example, the bit-planes 1621 may be intended to calculate the number of interruptions of the bit-runs generated in the respective bit-planes for the homogeneous-area determination, and the bit-planes 1622 may be intended to be discarded for the compression rate adjustment.

Figure 17:
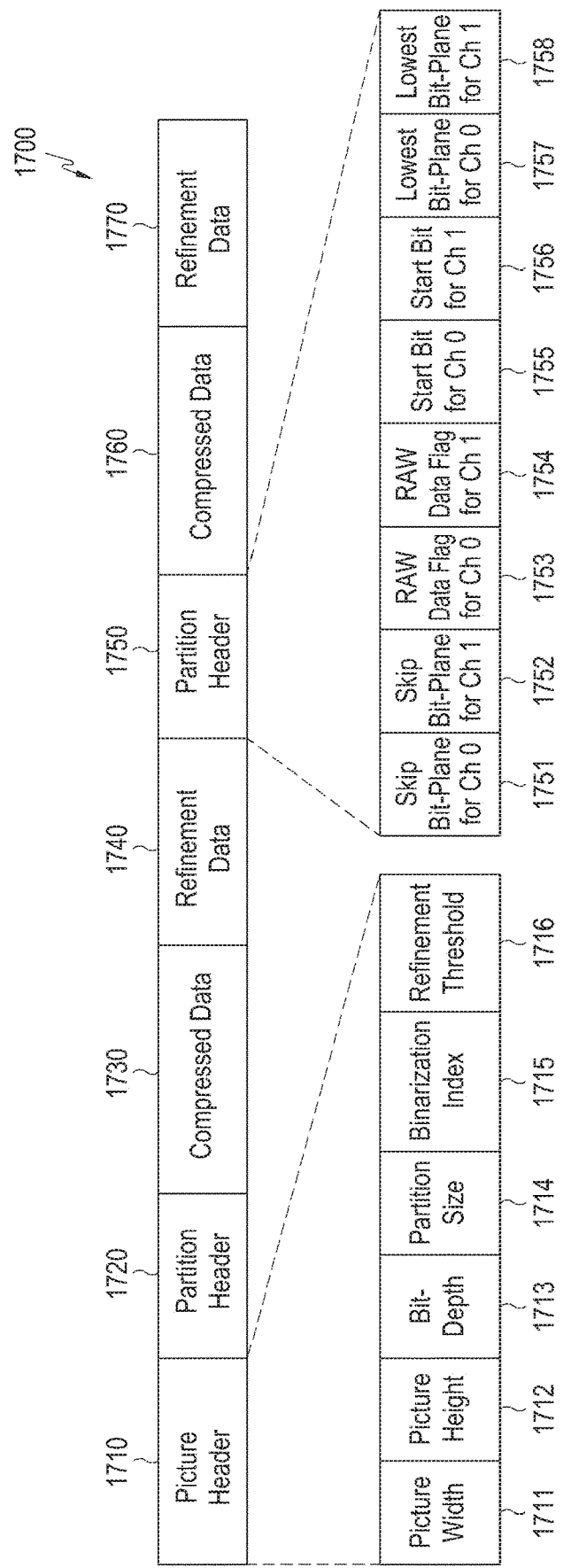
FIG. 17 is a view illustrating a configuration of a data field of a bitstream including compressed data generated according to various embodiments of the disclosure.

FIG. 17 is a view illustrating a configuration of a data field of a bitstream including generated compressed data according to various embodiments of the disclosure.

Referring to FIG. 17, the multiplexer 1420 may configure packet data 1700 as shown in the drawing.

According to various embodiments, one packet data 1700 may be configured to include an image header field 1710, one or more partition header fields 1720 and 1750, one or more compressed data fields 1730 and 1760, and one or more refinement data fields 1740 and 1770. According to various embodiments, the partition header fields 1720 and the compressed data field 1730 may be configured as many as the number of partitions constituting the image data.

The image header field 1710 may include general information on image data to be transmitted. According to various embodiments, the image header field 1710 may include at least one piece of data on an image width 1711, an image height 1712, a bit depth 1713, a partition size 1714, a binarization index 1715, a refinement threshold value 1716, a minimum bit-plane threshold value, a bit-run threshold value, and a dark area threshold value.

The data of the image header field 1710 may be defined as shown in Table 4 below.

TABLE 4

| Syntax | Semantics |
|---|---|
| Picture_Width | Indicating image width |
| Picture_Height | Indicating image height |
| Bit_Depth | Indicating image bit-depth. |
| Partition_Size | Indicating partition unit length |
| Binarization_Index | Indicating binarization methods used in respective bit-planes as many as number of bit-planes represented in Bit_Depth |
| Lowest_Bit_plane | Value for determining refinement bitstream condition |
| Bit Run Threshold | Threshold value for determining homogeneous area |
| Dark Region Threshold | Threshold value for determining dark area |

The partition header fields 1720 and 1750 may contain information related to the respective partitions, and may include at least one piece of data on skip bit-planes 1751 and 1752 for respective channels, raw data flags 1753 and 1754 for respective channels, start bits 1755 and 1756 for respective channels, lowest bit-planes 1757 and 1758 for respective channels, a compression partition size, a refinement partition size, and a raw image partition size according to various embodiments.

The data of the partition header fields 1720 and 1750 may be defined as shown in Table 5 below.

TABLE 5

| Syntax | Semantics |
|---|---|
| Skip_Bit_Plane_For_Ch0 | Number of bit-planes in which compressed data is not transmitted because all values in partition are the same in Ch0 (starting from MSB) |

TABLE 5-continued

| Syntax | Semantics |
| --- | --- |
| Skip_Bit_Plane_For_Ch1 | Number of bit-planes in which compressed data is not transmitted because all values in partition are the same in Ch1 (starting from MSB) |
| Raw_Data_Flag_For_Ch0 | Indicating whether or not to transmit raw data for each bit-plane in ch0 |
| Raw_Data_Flag_For_Ch1 | Indicating whether or not to transmit raw data for each bit-plane in ch1 |
| Start_Bit_For_Ch0 | Start bit value of each bit-plane in Ch0 |
| Start_Bit_For_Ch1 | Start bit value of each bit-plane in Ch1 |
| Lowest_Bit_Plane_For_Ch0 | LSB bit-plane transmitted in Ch0 |
| Lowest_Bit_Plane_For_Ch1 | LSB bit-plane transmitted in Ch1 |
| Compressed_Partition_Size | Indicating compression bitstream partition size |
| Refinement_Partition_Size | Indicating refinement bitstream partition size |
| Raw_Partition_Size | Indicating raw data bitstream partition size. |

The compressed data field 1760 may include compressed data, and the refinement data field 1770 may include an extension bit added for image quality enhancement.

Figure 18:
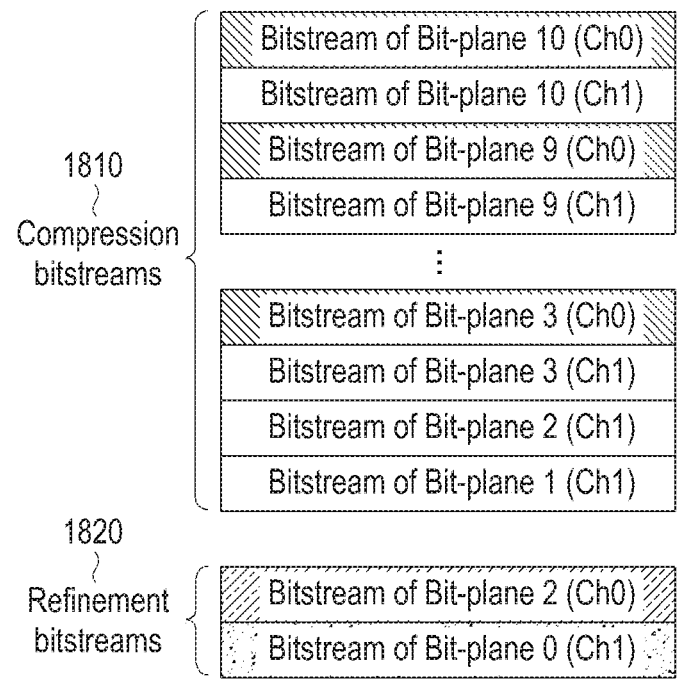
FIG. 18 is a view illustrating an example of a compression bitstream and a refinement bitstream according to various embodiments of the disclosure.

FIG. 18 is a view illustrating an example of a compression bitstream and a refinement bitstream according to various embodiments of the disclosure.

Referring to FIG. 18, a compression bitstream 1810 and a refinement bitstream 1820 may be configured as shown in the drawing in the case where the bit depth is 10, the skip bit-plane of the channel 0 is 0, the skip bit-plane of the channel 1 is 0, the lowest bit-plane of the channel 0 is 3, and the lowest bit-plane of the channel 1 is 1.

For example, since the lowest bit-plane is 3 for the channel 0, the $10^{th}$ bit-plane to the $3^{rd}$ bit-plane, excluding three bit-planes, may be transmitted as a compression bitstream. Since the lowest bit-plane is 1 for the channel 1, the $10^{th}$ bit-plane to the $1^{st}$ bit-plane, excluding one bit-plane, may be transmitted as a compression bitstream.

According to various embodiments, one bit-plane (e.g., the $2^{nd}$ bit-plane in the channel 0 and the $0^{th}$ bit-plane in the channel 1) may be added for the respective refinement bitstreams.

Figure 19:
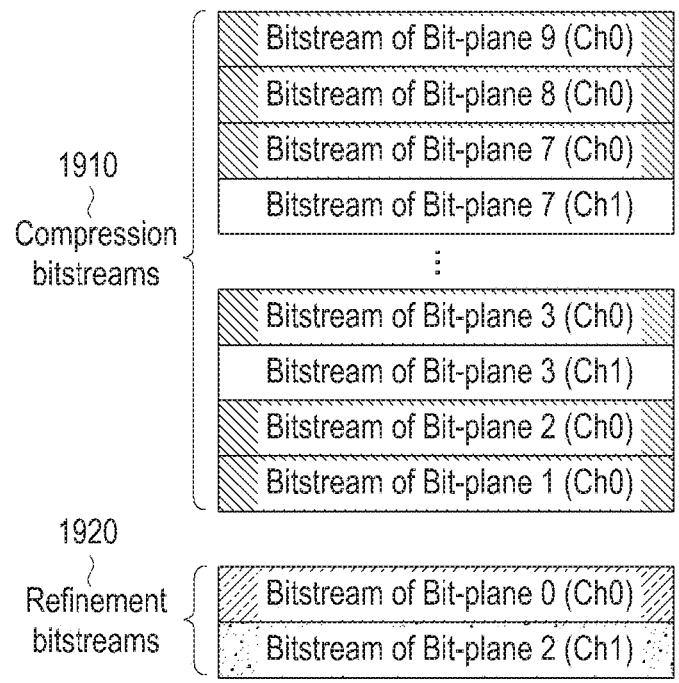
FIG. 19 is a view illustrating an example of a compression bitstream and a refinement bitstream according to various embodiments of the disclosure.

FIG. 19 is a view illustrating an example of a compression bitstream and a refinement bitstream according to various embodiments of the disclosure.

Referring to FIG. 19, a compression bitstream 1910 and a refinement bitstream 1920 may be configured as shown in the drawing in the case where the bit depth is 10, the skip bit-plane of the channel 0 is 1, the skip bit-plane of the channel 1 is 3, the lowest bit-plane of the channel 0 is 1, and the lowest bit-plane of the channel 1 is 3.

For example, since one bit-plane is omitted and the lowest bit-plane is 1 for the channel 0, the $9^{th}$ bit-plane to the $1^{st}$ bit-plane, excluding the $10^{th}$ bit-plane, may be transmitted as a compression bitstream. Since three bit-planes are omitted and the lowest bit-plane is 3 for the channel 1, the $7^{th}$ bit-planes to the $3^{rd}$ bit-plane, excluding the $10^{th}$, $9^{th}$, and $8^{th}$ bit-planes, may be transmitted as a compression bitstream.

According to various embodiments, one bit-plane (e.g., the $0^{th}$ bit-plane in the channel 0 and the $2^{nd}$ bit-plane in the channel 1) may be added to the respective refinement bitstreams.

Figure 20:
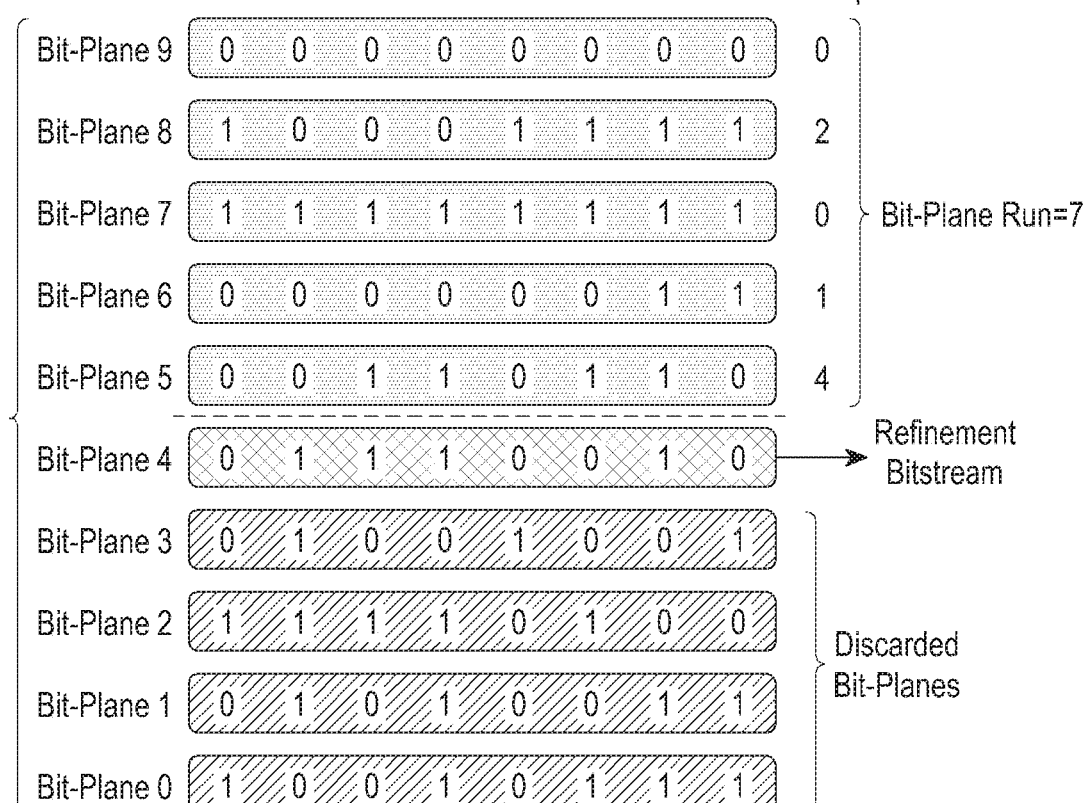
FIGS. 20 and 21 are views illustrating examples of a bit-plane configuration in a unit of a sub-partition according to various embodiments of the disclosure.
Figure 21:
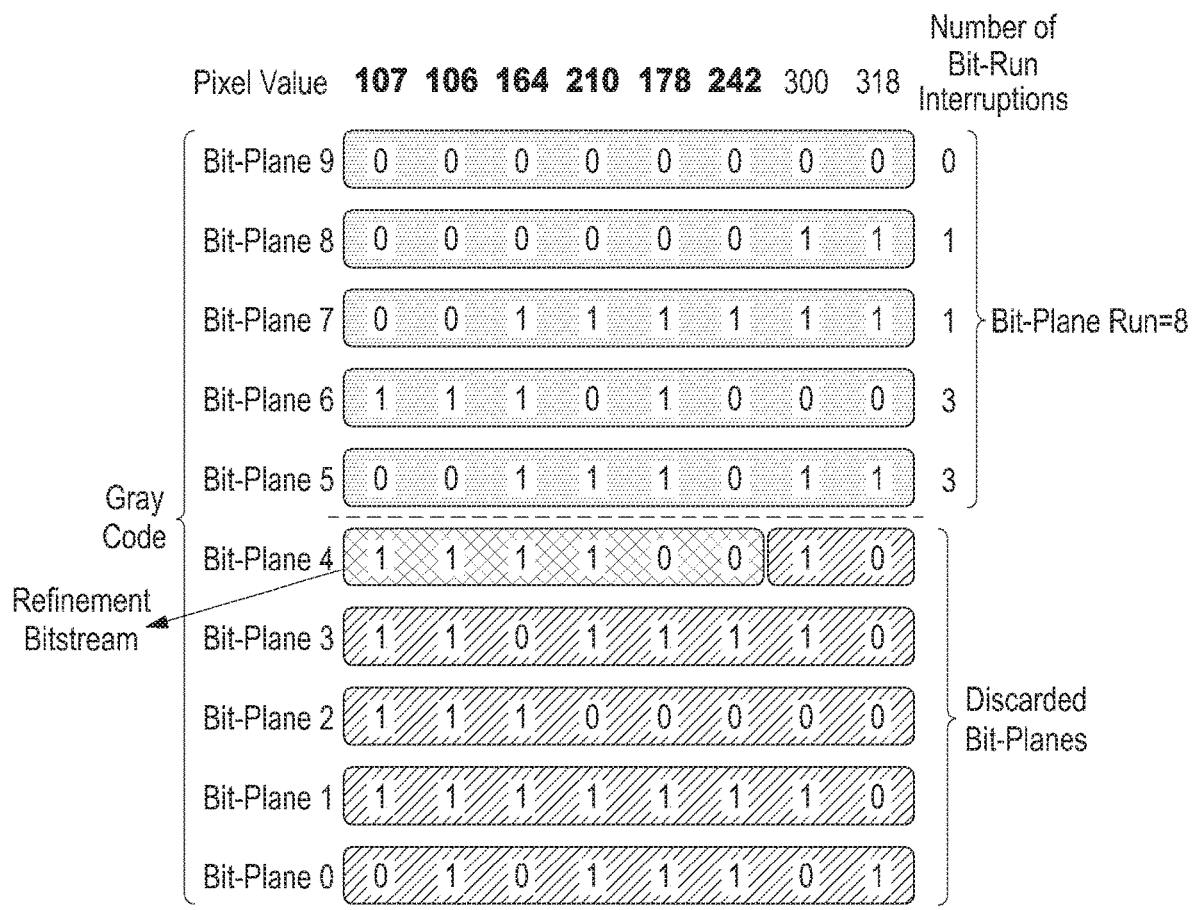

FIGS. 20 and 21 are views illustrating examples of a bit-plane configuration in a unit of a sub-partition according to various embodiments of the disclosure.

Referring to FIGS. 20 and 21, a plurality of pixels may constitute a bit-plane in the unit of a sub-partition.

According to various embodiments, in the embodiment shown in FIG. 20, bit-planes for respective bit positions may be configured using bit values corresponding to the respective bit positions for eight pixels the pixel values of which are 262, 235, 216, 218, 271, 313, 349, and 370, respectively.

For example, the pixel value of each pixel may be represented by 10 bits as shown in FIG. 20, and assuming that one sub-partition includes eight pixels, each of the eight pixels may be represented by 10 bits. The $0^{th}$ bit-plane may be configured by collecting eight bits corresponding to the $0^{th}$ bit in the pixel values for the eight pixels represented by the bits, and the $1^{st}$ bit-plane through the $9^{th}$ bit-plane may be configured in the same manner.

According to various embodiments, it is assumed that the lowest bit-plane threshold value is 4 and the bit-plane run threshold value is 8 in FIG. 20. As a result of decoding the respective bit-planes in FIG. 20, a total of five bit-planes from the $9^{th}$ bit-plane to the $5^{th}$ bit-plane may be selected as bit-planes to be transmitted in consideration of a target compression rate. According to various embodiments, the unselected bit-planes from the $0^{th}$ bit-plane to the $4^{th}$ bit-plane may be discarded.

According to various embodiments, since the lowest one of the selected bit-planes is the $5^{th}$ bit-plane and a predetermined lowest bit-plane threshold value is the $4^{th}$ bit-plane, the lowest bit-plane is greater than the lowest bit-plane threshold value, and thus subjective image quality degradation may occur due to information loss. When the lowest bit-plane is greater than the lowest bit-plane threshold value, the runs for the upper bit-planes may be checked according to the example shown in FIG. 15.

As shown in FIG. 20, as a result of checking the runs of five upper bit-planes (e.g., the $9^{th}$ bit-plane to the $5^{th}$ bit-plane), it can be seen that no run occurs in the $9^{th}$ bit-plane, two runs occur in the $8^{th}$ bit-plane, no run occurs in the $7^{th}$ bit-plane, one run occurs in the $6^{th}$ bit-plane, and four runs occur in the $5^{th}$ bit-plane.

According to various embodiments, the sum of the runs for the upper bit-planes is 7, and since the sum of the bit-runs is less than a predetermined bit-run threshold value of 8, an extension bit may be added as a refinement bitstream for each pixel. For example, respective bit values of the $4^{th}$ bit-plane may be added and transmitted as an extension bit.

According to various embodiments, in the embodiment shown in FIG. 21, bit-planes for respective bit positions may be configured using bit values corresponding to the respective bit positions with respect to eight pixels the pixel values of which are 107, 106, 164, 210, 178, 242, 300, and 318, respectively.

For example, the pixel value of each pixel may be represented by 10 bits as shown in FIG. 21, and assuming that one sub-partition includes eight pixels, each of the eight pixels may be represented by 10 bits. The $0^{th}$ bit-plane may be configured by collecting eight bits corresponding to the $0^{th}$ bit in the pixel values for the eight pixels represented by the bits, and the $1^{st}$ bit-plane through the $9^{th}$ bit-plane may be configured in the same manner.

According to various embodiments, it is assumed that the lowest bit-plane threshold value is 4, the bit-plane run threshold value is 8, and a dark area threshold value is 256 in FIG. 21. As a result of decoding the respective bit-planes in FIG. 21, a total of five bit-planes from the $9^{th}$ bit-plane to the $5^{th}$ bit-plane may be selected as bit-planes to be transmitted in consideration of a target compression rate. According to various embodiments, the unselected bit-planes from the $0^{th}$ bit-plane to the $4^{th}$ bit-plane may be discarded.

According to various embodiments, since the lowest one of the selected bit-planes is the $5^{th}$ bit-plane and a predetermined lowest bit-plane threshold value is the $4^{th}$ bit-plane, the lowest bit-plane is greater than the lowest bit-plane threshold value, and thus subjective image quality degradation may occur due to information loss. When the lowest bit-plane is greater than the lowest bit-plane threshold value, the runs for the upper bit-planes may be checked according to the example shown in FIG. 15.

As shown in FIG. 21, as a result of checking the runs of five upper bit-planes (e.g., the $9^{th}$ bit-plane to the $5^{th}$ bit-plane), it can be seen that no run occurs in the $9^{th}$ bit-plane, one run occurs in the $8^{th}$ bit-plane, one run occurs in the $7^{th}$ bit-plane, three runs occur in the $6^{th}$ bit-plane, and three runs occur in the $5^{th}$ bit-plane.

According to various embodiments, the sum of the runs for the upper bit-planes is 8, and since the sum of the bit-runs is not less than a predetermined bit-run threshold value of 8, it may be determined whether or not the pixel values for the respective pixels exceed a predetermined dark area threshold value of 256.

According to the above determination, since pixel values of 107, 106, 164, 210, 178, and 242 are smaller than the dark area threshold value of 256, one extra bit may be further transmitted for the corresponding pixels.

Figure 22:
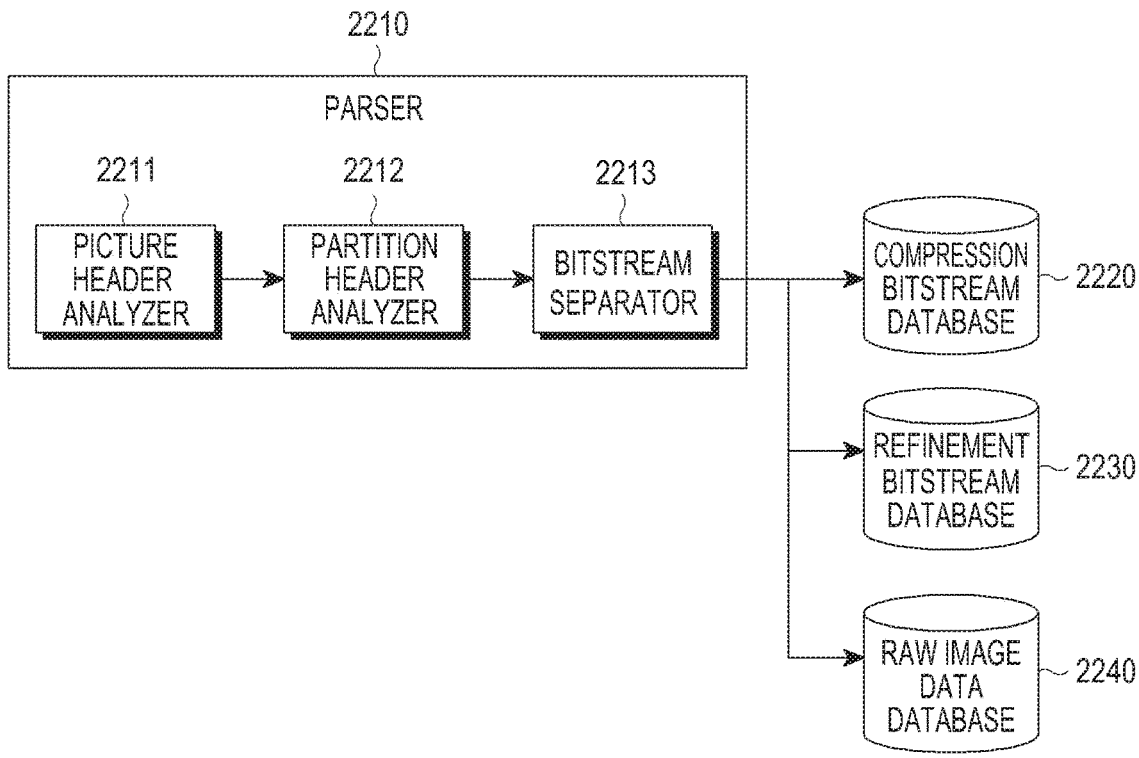
FIG. 22 is a view illustrating a detailed configuration of a parser for analyzing a received bitstream according to various embodiments of the disclosure.

FIG. 22 is a view illustrating a detailed configuration of a parser for analyzing a received bitstream according to various embodiments of the disclosure.

Referring to FIG. 22, a parser 2210 may include a picture header analyzer 2211, a partition header analyzer 2212, and a bitstream separator 2213.

For example, the picture header analyzer 2211 of the parser 2210 may identify values representing the characteristics of the entire image data based on the image header field 1710 illustrated in FIG. 17. For example, the picture header analyzer 2211 may identify each piece of data in the image header field 1710 including general information on the image data, and, according to various embodiments, the image header field 1710 may include at least one piece of data on an image width, an image height, a bit depth, a partition size, a binarization index, a refinement threshold value, a lowest bit-plane threshold value, a bit-run threshold value, and a dark area threshold value.

For example, the partition header analyzer 2212 of the parser 2210 may identify values representing necessary information in a partition unit based on the partition header fields 1720 illustrated in FIG. 17. For example, the partition header analyzer 2212 may identify each piece of data in the partition header field 1720 including information related to each partition, and, according to various embodiments, the partition header field 1720 may include at least one piece of data on a skip bit-plane for each channel, a raw data flag for each channel, a start bit for each channel, the lowest bit-plane for each channel, a compressed partition size, a refinement partition size, and a raw image partition size.

The bitstream separator 2213 of the parser 2210 may separate a compression bitstream, a refinement bitstream, a raw image bitstream, and the like with reference to the size information of each partition, which is identified through the partition header analyzer 2212, and may store the same in a compression bitstream database 2220, a refinement bitstream database 2230, and a raw image database 2240, respectively.

Figure 23:
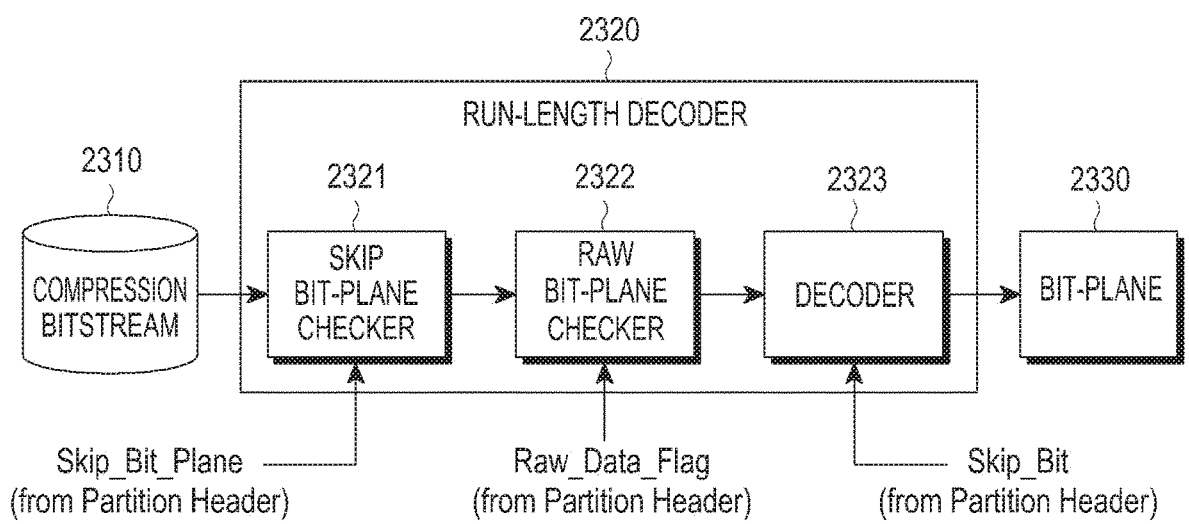
FIG. 23 is a view illustrating a detailed configuration of a decoder for decoding a compressed bitstream according to various embodiments of the disclosure.

FIG. 23 is a view illustrating a detailed configuration of a decoder for decoding a compressed bitstream according to various embodiments of the disclosure.

Referring to FIG. 23, the respective compression bitstreams, which are stored in the compression bitstream databases 2220 and 2310, may be decoded in the unit of a bit-plane through a run-length decoder 2320. The run-length decoder 2320 may be implemented by various algorithms, and may be implemented by a decoding method corresponding to the run-length encoder shown in FIG. 13.

According to various embodiments, the run-length decoder 2320 may be configured to include a skip bit-plane checker 2321, a raw bit-plane checker 2322, and a decoder 2323. The run-length decoder 2320 may determine whether or not to perform actual decoding before decoding by the decoder 2323 with reference to skip bit-plane information and a raw data flag included in the partition header information by means of the skip bit-plane checker 2321 and the raw bit-plane checker 2322.

When the skip bit-plane checker 2321 and the raw bit-plane checker 2322 determine to perform decoding on the corresponding bit-plane, the decoder 2323 may perform run-length decoding on the bit-plane to thus output a decoded bit-plane 2330.

Figure 24:
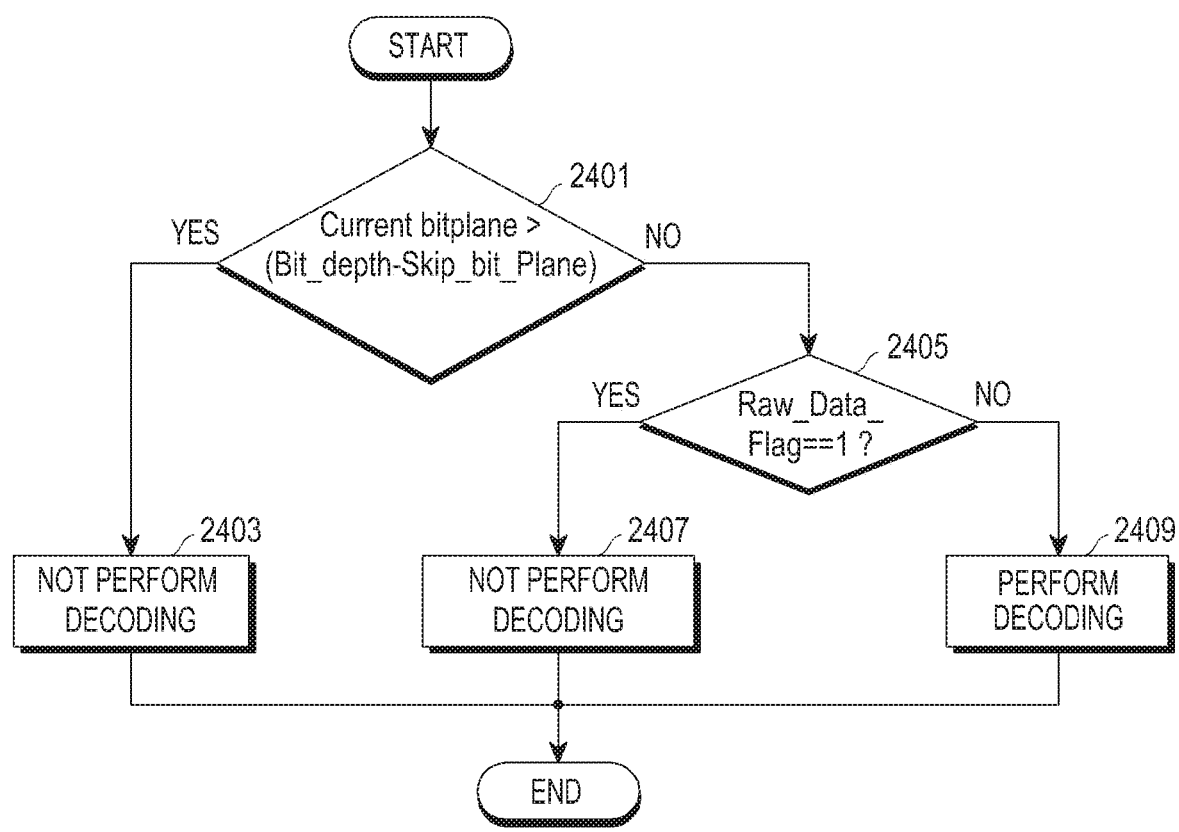
FIG. 24 is a flowchart illustrating a procedure of determining whether or not to perform decoding in a decoder according to various embodiments of the disclosure.

FIG. 24 is a flowchart illustrating a procedure of determining whether or not to perform decoding in a decoder according to various embodiments of the disclosure.

Referring to FIG. 24, the run-length decoder 2320 in FIG. 23 may determine whether or not to perform decoding on the respective bit-planes.

If the current bit-plane is greater than the difference between the bit depth and the skip bit-plane in operation 2401, the run-length decoder 2320 may not perform decoding in operation 2403.

If the current bit-plane is not greater than the difference between the bit depth and the skip bit-plane, the run-length decoder 2320 may check whether or not the raw image data flag is 1 in operation 2405. If the raw image data flag is 1 as a result of the checking above, the decoding may not be performed in operation 2407, and if the raw image data flag is not 1 as a result of the checking above, the decoding may be performed in operation 2409.

Figure 25:
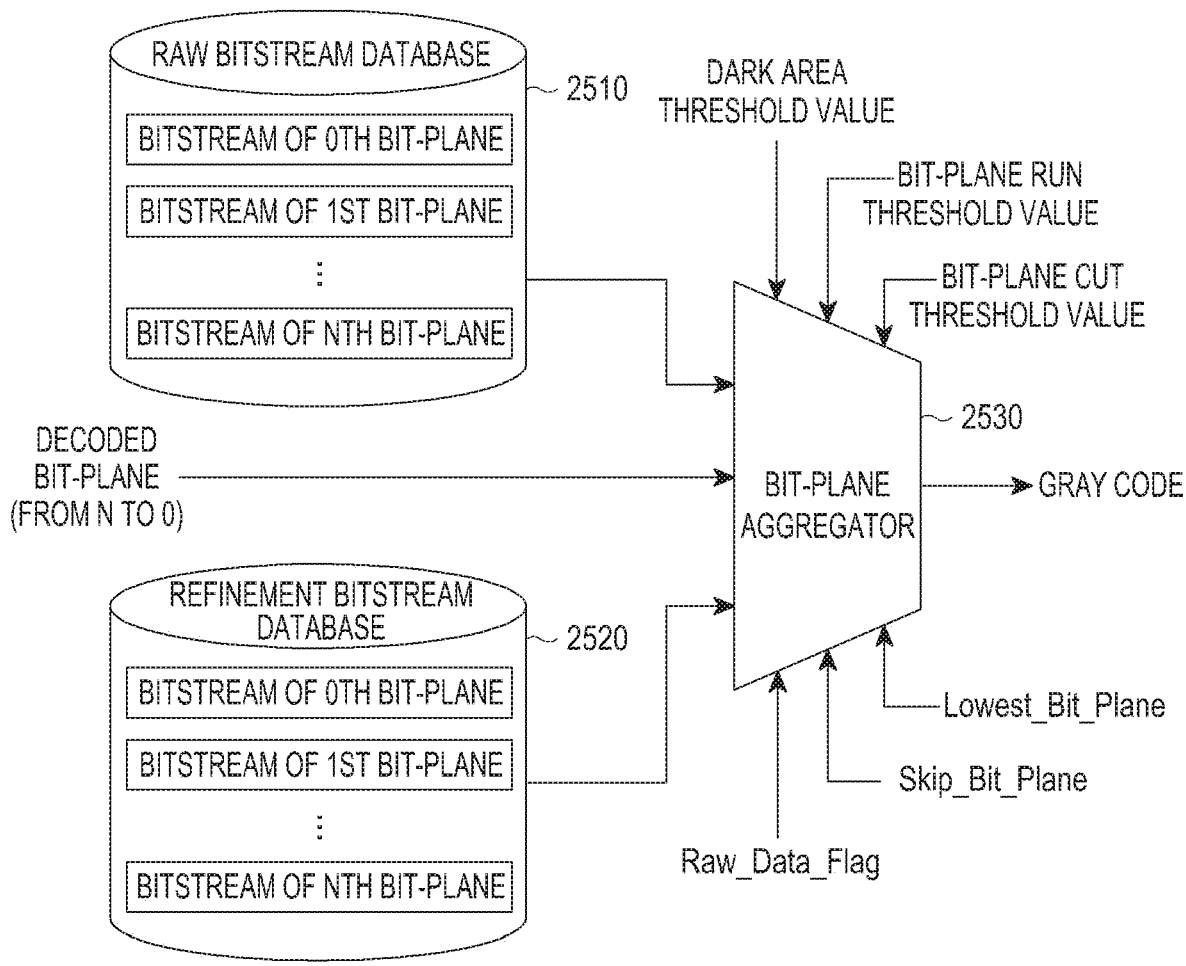
FIG. 25 is a view illustrating an example of merging decoded bit-planes according to various embodiments of the disclosure.

FIG. 25 is a diagram illustrating an example of merging decoded bit-planes according to various embodiments of the disclosure.

Referring to FIG. 25, a bit-plane aggregator 2530 may merge decoding values performed in the respective bit-planes, raw image bitstreams stored in a raw image bitstream database 2510, and refinement bitstreams stored in a refinement bitstream database 2520 to thus output gray codes. In order to merge the bit-planes, the bit-plane aggregator 2530 may refer to raw image data flags, skip bit-plane information, lowest bit-plane information, dark area threshold values, bit-plane run threshold values, bit-plane cut threshold values, and the like.

According to various embodiments, the bit-plane aggregator 2530 may fill as many bit-planes as the skip bit-plane value with a value of '0', starting from the bit-plane corresponding to the MSB, with reference to the skip bit-plane information. The bit-plane aggregator 2530 may fill the respective bit-planes with the raw image data or a decoded value with reference to the raw image data flag. The above process may be performed up to the bit-plane of the lowest bit-plane value. According to various embodiments, the refinement bit-plane may be determined through the various determination processes described above, and the corresponding bit-planes may be filled with refinement bits.

Figure 26:
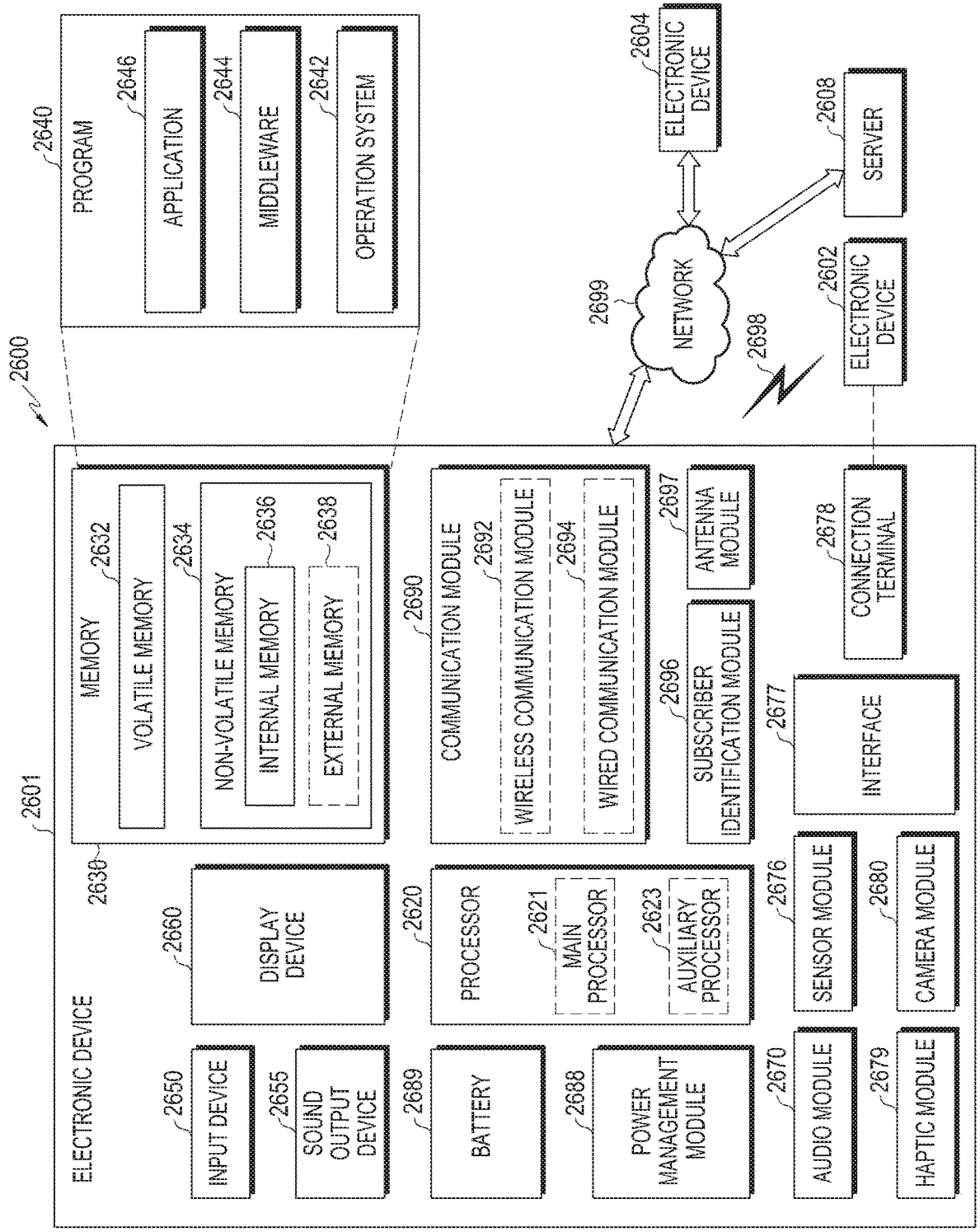
FIG. 26 is a view illustrating a network environment according to various embodiments of the disclosure.

FIG. 26 is a view illustrating a network environment according to various embodiments of the disclosure.

Referring to FIG. 26, a block diagram illustrate an example of an electronic device 2601 (e.g., the image sensor module 110 in FIG. 1, or the first device 210 or the second device 220 in FIG. 2) in a network environment 2600.

The electronic device 2601 may communicate with an electronic device 2602 through a first network 2698 (e.g., short-range wireless communication), or may communicate with an electronic device 2604 or a server 2608 through a second network 2699 (e.g., long-range wireless communication) in the network environment 2600. According to an embodiment, the electronic device 2601 may communicate with the electronic device 2604 via the server 2608. According to an embodiment, the electronic device 2601 may include a processor 2620, a memory 2630, an input device 2650, a sound output device 2655, a display device 2660, an audio module 2670, a sensor module 2676, an interface 2677, a haptic module 2679, a camera module 2680, a power management module 2688, a battery 2689, a communication module 2690, a subscriber identification module 2696, and an antenna module 2697. In some embodiments, the electronic device 2601 may exclude at least one of the above elements, or may further include other elements added thereto. In some embodiments, some elements, for example, may be configured to be integrated such as a sensor module 2676 (e.g., a fingerprint sensor, an iris sensor, or an illuminance sensor) embedded in a display device 2660 (e.g., the display).

The processor 2620 (e.g., the processor 120 in FIG. 1, or the compressing module 211 or the decompressing module 221 in FIG. 2), for example, may control one or more other elements (e.g., hardware or software elements) of the electronic device 2601 connected thereto, and may perform various data processing and arithmetic operations by driving software (e.g., programs 2640). The processor 2620 may load commands or data received from other elements (e.g., the sensor module 2676 or the communication module 2690) to a volatile memory 2632 to then process the same, and may store result data thereof in a non-volatile memory 2634. According to an embodiment, the processor 2620 may include a main processor 2621 (e.g., a CPU or an application processor), and may additionally or alternatively include a coprocessor 2623 (e.g., a graphics processing unit, an image signal processor, a sensor hub processor, or a communication processor), which is operated independently from the main processor 2621 and which has lower power consumption than that of the main processor 2621 or is specialized in a specified function. Here, the coprocessor 2623 may be operated separately from the main processor 2621 or while being embedded therein.

In this case, the coprocessor 2623 may control at least some of the functions or states related to at least one of the elements (e.g., the display device 2660, the sensor module 2676, or the communication module 2690) of the electronic device 2601 on behalf of the main processor 2621, for example, while the main processor 2621 is in the inactive (e.g., sleep) state or along with the main processor 2621 while the main processor 2621 is in the active (e.g., application executing) state. According to an embodiment, the coprocessor 2623 (e.g., an image signal processor or a communication processor) may be implemented as a part of other elements (e.g., the camera module 2680 or the communication module 2690), which are operatively related thereto. The memory 2630 may store a variety of data used by at least one element (e.g., the processor 2620 or the sensor module 2676) of the electronic device 2601 such as software (e.g., the programs 2640) and input or output data for commands related thereto. The memory 2630 may include a volatile memory 2632 or a non-volatile memory 2634.

The programs 2640 are software stored in the memory 2630, and may include, for example, an operating system 2642, middleware 2644, or applications 2646.

The input device 2650 may receive commands or data to be used for the element (e.g., the processor 2620) of the electronic device 2601 from the outside (e.g., a user) of the electronic device 2601, and may include, for example, a microphone, a mouse, or a keyboard.

The sound output device 2655 is intended to output a sound signal to the outside of the electronic device 2601, and may include, for example, a speaker used for a general purpose, such as multimedia reproduction or record reproduction, and a receiver used only for call reception. According to an embodiment, the receiver may be configured integrally with or separately from the speaker.

The display device 2660 is intended to visually provide information to a user of the electronic device 2601, and may include, for example, a display, a hologram device, or a projector, and a control circuit for controlling the same. According to an embodiment, the display device 2660 may include a touch circuitry or a pressure sensor capable of measuring the intensity of touch pressure.

The audio module 2670 may convert sounds to electrical signals, and vice versa. According to an embodiment, the audio module 2670 may receive sounds through the input device 2650, or may output sounds through the sound output device 2655 or an external electronic device {e.g., the electronic device 2602 (e.g., speakers or headphones)}, which is connected to the electronic device 2601 in a wired or wireless manner.

The sensor module 2676 may generate an electrical signal or a data value corresponding to the internal operating state (e.g., power or temperature) of the electronic device 2601 or external environmental conditions. The sensor module 2676 may include, for example, a gesture sensor, a gyro-sensor, a barometric sensor, a magnetic sensor, an acceleration sensor, a grip sensor, a proximity sensor, a color sensor, an IR sensor, a biometric sensor, a temperature sensor, a humidity sensor, or an illuminance sensor.

The interface 2677 may support a specified protocol for a connection with an external electronic device (e.g., the electronic device 2602) by wire or wireless communication. According to an embodiment, the interface 2677 may include a high-definition multimedia interface (HDMI), a universal serial bus (USB) interface, a secure digital (SD) card interface, or an audio interface.

The connection terminal 2678 may include a connector, such as an HDMI connector, a USB connector, an SD card connector, or an audio connector (e.g., a headphone connector), which enables a physical connection between the electronic device 2601 and an external electronic device (e.g., the electronic device 2602).

The haptic module 2679 may convert an electrical signal into a mechanical stimulus (e.g., vibration or motion) or an electrical stimulus that the user can perceive through a tactile or kinetic sense. The haptic module 2679 may include, for example, a motor, a piezoelectric element, or an electrical stimulation device.

The camera module 2680 (e.g., the image sensor module 110 in FIG. 1) may photograph still images and moving pictures. According to an embodiment, the camera module 2680 may include one or more lenses, an image sensor (e.g., the image sensor 111 in FIG. 1), an image signal processor (e.g., the processor 120 in FIG. 1), or a flash.

The power management module 2688 may manage power supplied to the electronic device 2601, and may be configured as at least a part of, for example, a power management integrated circuit (PMIC).

The battery 2689 is intended to supply power to one or more elements of the electronic device 2601, and may include, for example, a non-rechargeable primary battery, a rechargeable secondary battery, or a fuel cell.

The communication module 2690 may support establishment of a wired or wireless communication channel between the electronic device 2601 and an external electronic device (e.g., the electronic device 2602, the electronic device 2604, or the server 2608) and execution of communication through the established communication channel. The communication module 2690 may include one or more communication processors that support wired or wireless communications and that are operated independently from the processor 2620 (e.g., an application processor). According to an embodiment, the communication module 2690 may include a wireless communication module 2692 {e.g., a cellular communication module, a short-range wireless communication module, or a global navigation satellite system (GNSS) communication module} or a wired communication module 2694 {e.g., a local area network (LAN) communication module, or a power line communication module), and may communicate with external electronic devices through the first network 2698 {e.g., a short-range communication network such as Bluetooth, WiFi direct, or infrared data association (IrDA)} or the second network 2699 {e.g., a long-range communication network such as a cellular network, the Internet, or a computer network (e.g., LAN or a wide area network (WAN))} using a corresponding communication module. The various types of communication modules 2690 described above may be implemented as a single chip or as separate chips.

According to an embodiment, the wireless communication module 2692 may perform identification and verification on the electronic device 2601 in the communication network using user information stored in the subscriber identification module 2696.

The antenna module 2697 may include one or more antennas for transmitting or receiving signals or power to or from the outside. According to an embodiment, the communication module 2690 (e.g., the wireless communication module 2692) may transmit or receive signals to or from an external electronic device via an antenna suitable for the communication scheme.

Some of the elements may be connected to each other through a communication scheme between peripheral devices {e.g., a bus, a general purpose input/output (GPIO), a SPI, or a mobile industry processor interface (MIPI)}, and may exchange signals (e.g., commands or data) with each other.

According to an embodiment, commands or data may be transmitted or received between the electronic device 2601 and the external electronic device 2604 via the server 2608 connected to the second network 2699. Each of the electronic devices 2602 and 2204 may be the same as or different from the electronic device 2601 as to the type thereof. According to an embodiment, all or some of the operations performed in the electronic device 2601 may be performed by one or more external electronic devices. According to an embodiment, when the electronic device 2601 is to perform some functions or services automatically or upon request, the electronic device 2601 may make a request to the external electronic device for performing at least some functions related thereto, instead of performing the functions or services by itself or in addition thereto. The external electronic device, which has received the request, may execute the requested functions or additional functions, and may transmit the results thereof to the electronic device 2601. The electronic device 2601 may provide the requested functions or services using directly the received result or by further processing the same. To this end, for example, cloud computing, distributed computing, or client-server computing technology may be used.

Figure 27:
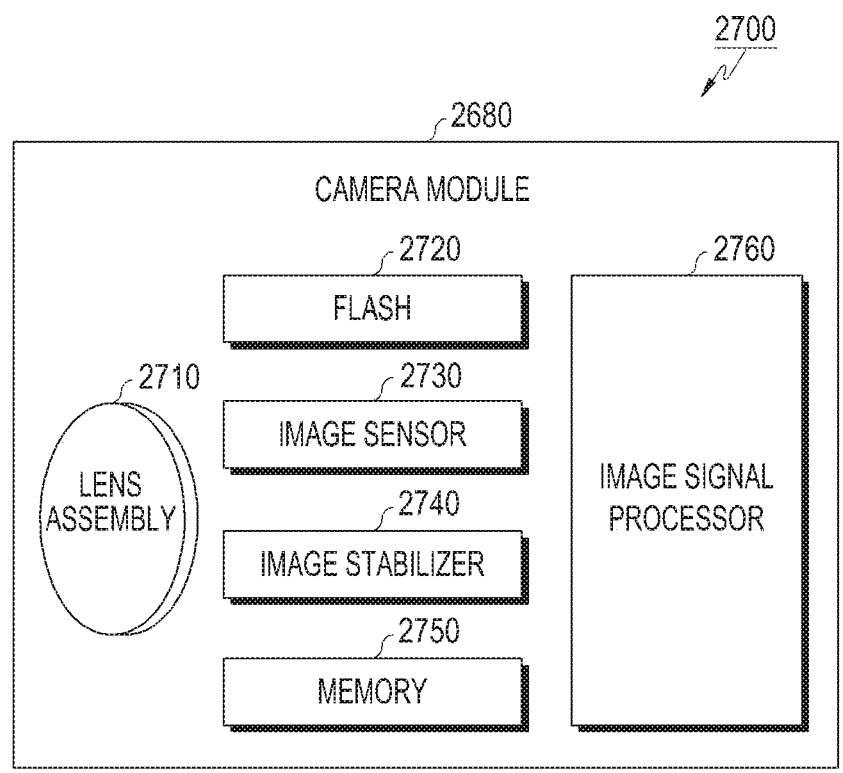
FIG. 27 is a block diagram of a camera module according to various embodiments of the disclosure.

FIG. 27 is a block diagram of a camera module according to various embodiments of the disclosure.

Referring to FIG. 27, a block diagram 2700 illustrate an example of a camera module 2680 (e.g., the image sensor module 110 in FIG. 1), which may include a lens assembly 2710, a flash 2720, an image sensor 2730 (e.g., the image sensor 111 in FIG. 1), an image stabilizer 2740, a memory 2750 {e.g., a buffer memory (e.g., the memory 113 in FIG. 1)}, or an image signal processor 2760 (e.g., the processor 120 in FIG. 1). The lens assembly 2710 may collect light emitted from a subject, which is a target to be photographed. The lens assembly 2710 may include one or more lenses. According to an embodiment, the camera module 2680 may include a plurality of lens assemblies 2710. In this case, the camera module 2680, for example, may be a dual camera, a 360-degree camera, or a spherical camera. The plurality of lens assemblies 2710 may have the same lens property (e.g., a view angle, a focal length, autofocus, f-number, or optical zoom), or at least one lens assembly may have at least one lens property different from that of another lens assembly. The lens assembly 2710 may include, for example, a wide-angle lens or a telephoto lens. The flash 2720 may emit light for enhancing the light emitted from the subject. The flash 2720 may include one or more light-emitting diodes {e.g., red-green-blue (RGB) light emitting diodes (LEDs), a white LED, an infrared LED, or an ultraviolet LED) or a xenon lamp.

The image sensor 2730 may acquire an image corresponding to the subject by converting the light, which is transmitted from the subject through the lens assembly 2710, into an electrical signal. According to an embodiment, the image sensor 2730, for example, may include an image sensor selected from the image sensors having different properties, such as an RGB sensor, a black-and-white (BW) sensor, an IR sensor, or an ultraviolet (UV) sensor, a plurality of image sensors having the same property, or a plurality of image sensors having different properties. The respective image sensors included in the image sensor 2730 may be implemented as, for example, a charged coupled device (CCD) sensor or a complementary metal oxide semiconductor (CMOS) sensor.

The image stabilizer 2740 may respond to motion of the camera module 2680 or an electronic device 2601 including the same, and may move at least one lens included in the lens assembly 2710 or the image sensor 2730 in a specific direction, or may control the same (for example, adjusting a read-out timing or the like) in order to compensate for, at least in part, negative effects (e.g., image jitter) on the photographed image due to motion. According to an embodiment, the image stabilizer 2740 may be implemented, for example, as an optical image stabilizer, and may detect the motion using a gyro-sensor (not shown) or an acceleration sensor (not shown) disposed either inside or outside the camera module 2680.

The memory 2750 may temporarily store at least some of the image acquired through the image sensor 2730 for subsequent image processing. For example, when image acquisition is delayed due to a shutter or when a plurality of images are acquired at a high speed, the acquired original images (e.g., high-resolution images) may be stored in the memory 2750, and duplicate images (e.g., low-quality images) corresponding thereto may be previewed through the display device 2660. Thereafter, if a specified condition is satisfied (e.g., a user input or a system command), at least some of the original images stored in the memory 2750 may be acquired and processed, for example, by the image signal processor 2760. According to an embodiment, the memory 2750 may be configured as at least a part of the memory 2630, or may be configured as a separate memory operating independently from the memory 2630.

The image signal processor 2760 may perform image processing {e.g., depth map generation, three-dimensional modeling, panorama generation, feature point extraction, image synthesis, or image compensation (e.g., noise reduction, resolution adjustment, brightness adjustment, blurring, sharpening, or softening)} for the images acquired through the image sensor 2730 or for the images stored in the memory 2750. Additionally or alternatively, the image signal processor 2760 may perform control (e.g., exposure time control, lead-out timing control, or the like) for at least one (e.g., the image sensor 2730) of the elements included in the camera module 2680. The image processed by the image signal processor 2760 may be restored in the memory 2750 for further processing, or may be transmitted to an external element of the camera module 2680 (e.g., the memory 2630, the display device 2660, the electronic device 2602, the electronic device 2604, or the server 2608). According to an embodiment, the image signal processor 2760 may be configured as at least a part of the processor 2620, or may be configured as a separate processor operating independently from the processor 2620. In the case of a separate processor, the images processed by the image signal processor 2760 may be displayed through the display device 2660 without or after further image processing by the processor 2620.

According to an embodiment, the electronic device 2601 may include two or more camera modules 2680 that have different properties or functions, respectively. In this case, for example, at least one camera module 2680 may be a wide-angle camera or a front camera, and at least one of the remaining camera modules may be a telephoto camera or a rear camera.

Figure 28:
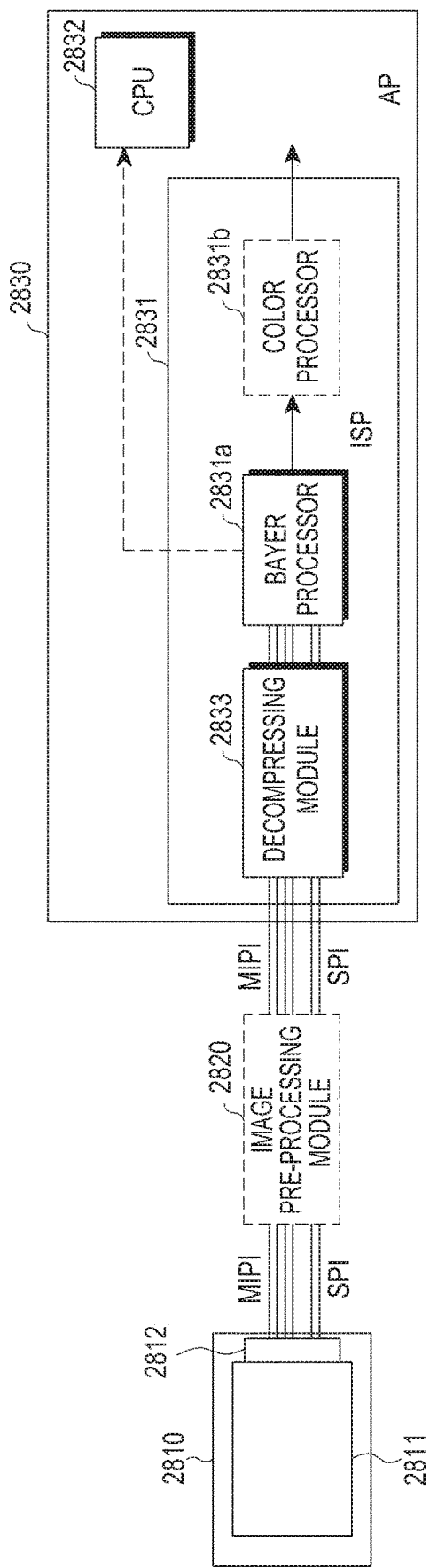
FIG. 28 is a block diagram illustrating a detailed structure of an electronic device according to various embodiments of the disclosure.

FIG. 28 is a block diagram illustrating a detailed structure of an electronic device according to various embodiments of the disclosure.

Referring to FIG. 28, an electronic device (e.g., the electronic device in FIG. 1, or the first device 210 or the second device 220 in FIG. 2), according to various embodiments, may be configured to include an image sensor module 2810 (e.g., the image sensor module 110 in FIG. 1), an image pre-processing module 2820 (e.g., a companion chip), and an AP 2830 (e.g., the processor 120 in FIG. 1). The image processing device may be implemented such that the image sensor module 2810 is directly connected to the AP 2830 without the image pre-processing module 2820.

The image sensor module 2810 is intended to sense an image, and may transmit respective sensed pixel values to the image pre-processing module 2820 or the AP 2830 through a mobile industry processor interface (MIPI) line. In addition, the image sensor module 2810 may transmit and receive various control signals through a SPI. The image sensor module 2810 may be configured to include an image sensor 2811 {e.g., a CMOS sensor (e.g., the image sensor 111 in FIG. 1)} and a control circuit 2812 (e.g., the control circuit 112 in FIG. 1).

The image pre-processing module 2820 may be further provided in order to support a specific function of the image sensor. For example, the image pre-processing module 2820 may perform pre-processing for improving the image quality. According to various embodiments, at least some of the image compression functions of the control circuit 112 in FIG. 1 described above may be configured to be included in the control circuit 2812 or the image pre-processing module 2820.

The AP 2830 may be configured to include an image signal processor (ISP) 2831 and a CPU 2832. The image signal processor 2831 may be configured to include a Bayer processor 2831*a*, a color processor 2831*b* (Luma/Color), and a decompressing module 2833 (e.g., the decompressing module 221 in FIG. 2).

Figure 29:
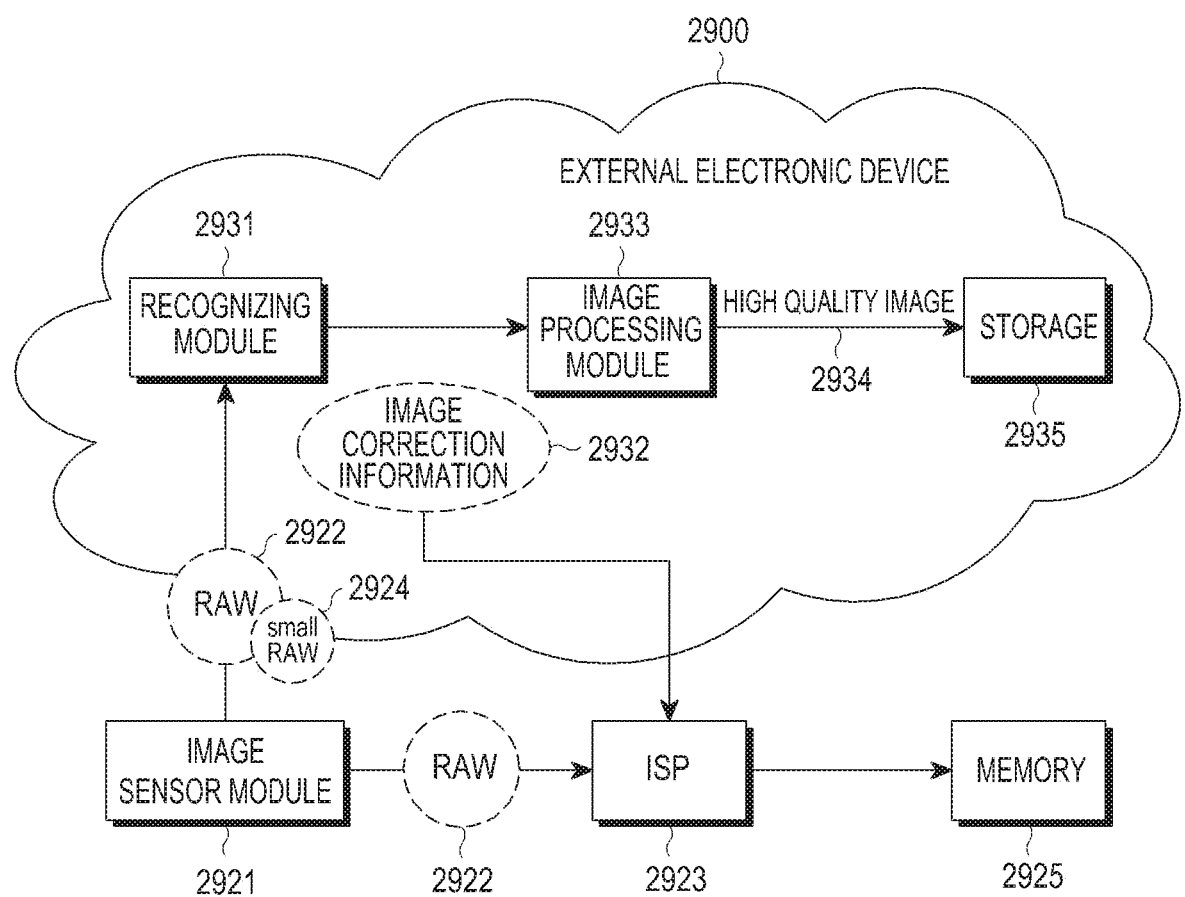
FIG. 29 is a view illustrating detailed structures of an electronic device and an external electronic device according to various embodiments of the disclosure.

FIG. 29 is a view illustrating detailed structures an electronic device and an external electronic device according to various embodiments of the disclosure.

Referring to FIG. 29, an electronic device (e. g., the electronic device 2601 in FIG. 26) may include an image sensor module 2921 (e.g., the image sensor module 110 or 2810), an ISP 2923 (e.g., the processor 120 or the ISP 2831), and a memory 2925. The external electronic device 2900 (e.g., the electronic device 2602 or 2604 or the server 2608 in FIG. 26) may include a recognizing module 2931, an image processing module 2933, and a storage 2935. The recognizing module 2931 may be a logical module, or may be implemented as a processor of the external electronic device 2900. The image processing module 2933 may also be implemented as a processor of the external electronic device 2900, and, for example, a processor of the external electronic device 2900 may perform both recognition and image processing. Although it is not shown in the drawing, the electronic device 2601 may include a communication module (e.g., the interface 2677 or the communication module 2690) for transmitting and receiving data to and from the external electronic device 2900. The external electronic device 2900 may include a communication module capable of transmitting and receiving data to and from the electronic device 2601.

The image sensor module 2921 (e.g., the control circuit 112 or 2812) may obtain images for external objects, and may generate raw images 2922 corresponding thereto. The image sensor module 2921 may transmit the raw images 2922 to the ISP 2923. In various embodiments, the image sensor module 2921 may generate small raw images 2924 to thus transmit the same to the external electronic device 2900 via a communication module.

According to various embodiments, the small raw image 2924 refers to a raw image having a size smaller than the data size of the raw image 2922, and is not limited to an image generated in a specific format or by a specific method. For example, the small raw image 2924 may be generated by reducing the capacity of the raw image 2922, and may be referred to as a 'light image'. For example, the electronic device 2601 may generate a small raw image 2924 from the raw image 2922 using various down-scale or down-sampling methods. The electronic device 2601, for example, may generate a small raw image 2924 having a size smaller than the data size of the raw image 2922 by performing at least one of adjusting the resolution of the raw image 2922, selecting at least some of a plurality of frequency bands, or selecting at least one of a plurality of bit-plane levels. The electronic device 2601, for example, may generate the small raw image 2924 by extracting a low-frequency band from the raw image 2922. The electronic device 2601, for example, may generate the small raw image 2924 by selecting some of a plurality of bit-plane levels of the raw image 2922. The small raw image 2924 may include at least some of the information on the raw image 2922, and may have a smaller capacity than that of the raw image 2922. When the small raw image 2924 is transmitted to the external electronic device 2900, instead of the raw image 2922, a smaller amount of data is transmitted, thereby transmitting images more rapidly to the external electronic device 2900.

In another embodiment, a processor of the electronic device 2601, instead of the image sensor module 2921, may generate the small raw image 2924, and the generated small raw image 2924 may be transmitted to the external electronic device 2900 through a communication module. The image sensor module 2921 may process at least a portion of the raw image 2922, or may compress the raw image 2922 in order to transmit the same to the outside {e.g., a processor (e.g., an ISP)} or the external electronic device 2900. The image sensor module 2921 may transmit the compressed raw image 2922 to the ISP 2923 or to the external electronic device 2900 (e.g., the image processing module 2933). In another embodiment, the ISP 2923 (e.g., the processor 120 or the ISP 2831) may transmit, to the external electronic device 2900, the compressed raw image or the small raw image 2924 received from the image sensor module 2921. The image sensor module 2921 may compress the raw image 2922 to then temporarily store the same in an internal memory of the image sensor module 2921 for partial processing thereof. The recognizing module 2931 of the external electronic device 2900 may obtain the small raw image 2924 through a communication module, and may segment one or more image areas from the small raw image 2924. The recognizing module 2931 may recognize the respective image areas separated as a result of the segmentation. Image correction information 2932 including at least one piece of information related to a plurality of image areas generated by the recognizing module 2931, such as coordinate information of an image area or a recognition result thereof, may be generated. The image correction information 2932 may be transmitted to the electronic device 2601. The ISP 2923 may correct the raw image 2922 using the image correction information 2932, thereby generating a corrected image. The corrected image, for example, may have a format of YUV. The corrected image may be stored in the memory 2925. Alternatively, the corrected image, for example, may be compressed in a joint photographic experts group (JPEG) manner, and the compressed image may be stored in the memory 2925.

In various embodiments, the raw image 2922 provided from the image sensor module 2921 may be transmitted to the external electronic device 2900 separately from the small raw image 2924. Since the raw image 2922 is larger in capacity than the small raw image 2924, the small raw image 2924 may be first transmitted to the external electronic device 2900, and then the raw image 2922 may be transmitted to the external electronic device 2900. For example, the raw image 2922 may be transmitted to the external electronic device 2900 while the ISP 2923 performs correction for the raw image 2922. The raw image 2922 generated by the image sensor module 2921 may be uploaded to the external electronic device 2900 without further processing, or a pre-processed image obtained by performing lens distortion compensation or noise elimination may be uploaded thereto. The above-described pre-processing may be performed by the external electronic device 2900. The external electronic device 2900 may perform 'demosaic' processing, image format modification, or pre-processing for improving an image recognition rate. The image processing module 2933 of the external electronic device 2900 may correct the received raw image 2922. The external electronic device 2900 may correct the raw image 2922 using the image correction information 2932 that has been generated, or may correct the raw image 2922 using extended image correction information. The raw image 2922 may have higher resolution than the small raw image 2924 so that the image processing module 2933 of the external electronic device 2900 may obtain more detailed and extended image correction information from the high-quality image. The image processing module 2933 may generate the extended image correction information using both the existing image correction information and the raw image 2922. The image processing module 2933 may obtain a high-quality image 2934 by correcting the raw image 2922 using the extended image correction information. The high-quality image 2934 may be stored in the storage 2935 of the external electronic device 2900, and may be downloaded to the electronic device 2601.

The electronic devices, according to various embodiments disclosed herein, may be various types of devices. The electronic device, for example, may include at least one of a portable communication device (e.g., a smart phone), a computer device, a portable multimedia device, a portable medical device, a camera, a wearable device, or a home appliance. The electronic device according to the embodiment of the disclosure is not limited to the above-mentioned devices.

The term "module" used herein encompasses a unit including hardware, software, or firmware, and may be used interchangeably with a term such as, logic, a logic block, a component, or a circuit. The module may be an integrally configured component, a minimum unit for performing one or more functions, or a part thereof. For example, the module may be configured as an application-specific integrated circuit (ASIC).

The various embodiments of the disclosure may be implemented as software (e.g., the program 2640) including instructions stored in a machine (e.g., computer)-readable storage medium (e.g., the internal memory 2636 or the external memory 2638). The machine is a device for calling stored instructions from a storage medium and, based on the called instructions, performing operation, and may include the electronic device (e.g., the electronic device 2601) according to the disclosed embodiments. When the instructions are executed by a processor (e.g., the processor 2620), the processor may perform the functions corresponding to the instructions directly or using other elements under the control of the processor. The instructions may include codes generated or executed by a compiler or an interpreter. The machine-readable storage medium may be provided in the form of a non-transitory storage medium. Here, the 'non-transitory' storage medium means that the storage medium is tangible without including signals, and can be configured such that data is stored in the storage medium semi-permanently or temporarily.

According to an embodiment, a method according to various embodiments disclosed herein may be provided while being included in a computer program product. The computer program product may be traded between a seller and a purchaser as a commodity. The computer program product may be distributed in the form of a machine-readable storage medium {e.g., a compact disc read only memory (CD-ROM)}, or may be distributed on-line through an application store (e.g., Play Store™). In the case of online distribution, at least some of the computer program products may be temporarily stored or generated in a storage medium, such as a memory of a server of a manufacturer, a server of an application store, or a relay server.

Each of the elements (e.g., a module or a program), according to various embodiments, may be configured as a single entity or a plurality of entities, and some of the sub-elements described above may be omitted, or other sub-elements may be further included in the various embodiments. Alternatively or additionally, some elements (e.g., a module or a program) may be integrated into a single entity so as to perform functions the same as or similar to those performed by the respective elements prior to integration. Operations performed by a module, a programming module, or other elements according to various embodiments may be executed sequentially, in parallel, repeatedly, or in a heuristic manner. At least some operations may be executed according to another sequence, may be omitted, or may further include other operations.

The computer readable recoding medium may include a hard disk, a floppy disk, magnetic media (e.g., a magnetic tape), optical media (e.g., a CD-ROM and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, a storage medium may store commands that allow, when executed by at least one processor, the processor to perform one or more operations of: obtaining raw image data from an image sensor; generating a plurality of bit-planes configured based on bit positions of respective pixel values for a plurality of pixels corresponding to at least some of the obtained raw image data; generating compressed data in which one or more of the plurality of bit-planes are compressed; and transmitting a bitstream containing the generated compressed data to the processor.

The embodiments of the disclosure disclosed in the specification and the drawings are only particular examples proposed in order to easily describe the technical matters of the disclosure and help with comprehension of the disclosure, and do not limit the scope of the disclosure. Therefore, in addition to the embodiments disclosed herein, the scope of the various embodiments of the disclosure should be construed to include all modifications or modified forms drawn based on the technical idea of the various embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one processor;
   an image sensor configured to obtain raw image data; and
   a control circuit electrically connected to the at least one processor,
   wherein the control circuit is configured to:
      generate a plurality of bit-planes configured, based on bit positions of respective pixel values for a plurality of pixels of the raw image data,
      select a first number of bit-planes, corresponding to first bits including at least a most significant bit (MSB) among the plurality of bit-planes to satisfy a predetermined compression rate for the raw image data, the plurality of bit-planes including the first number of bit-planes and a second number of bit-planes, corresponding to second bits including at least a least significant bit (LSB),
      identify whether a position of a lowest bit-plane of the first number of bit-planes is greater than a first threshold value,
      in response to identifying that the position of the lowest bit-plane is greater than the first threshold value, identify a number of times by which a bit-run is interrupted in each of the first number of bit-planes,
      based on identifying the number of times, determine whether to add at least one bit included in the second number of bit-planes to the first number of bit-planes,
      in response to determining to add the at least one bit to the first number of bit-planes, compress data including the first number of bit-planes and the at least one bit, and
      transmit a bitstream containing the compressed data to the at least one processor.

2. The electronic device of claim 1, wherein, when the control circuit generates of the plurality of bit-planes, the control circuit is further configured to:
   separate the raw image data obtained from the image sensor into a plurality of color channels comprising a first color channel and a second color channel, and
   generate a first bit-plane corresponding to the first color channel and a second bit-plane corresponding to the second color channel.

3. The electronic device of claim 1, wherein the control circuit is further configured to:
   convert at least some of the raw image data obtained from the image sensor into gray codes, and
   generate the plurality of bit-planes for the raw image data converted into the gray codes.

4. The electronic device of claim 1, wherein the control circuit is further configured to:
  identify a sum of the number of times,
  determine whether the sum of the number of times is greater than a second threshold value, and
  in response to determining that the sum of the number of times is greater than the second threshold value, determine to add the at least one bit to the first number of bit-planes.

5. The electronic device of claim 1, wherein, when the control circuit generates the plurality of bit-planes, the control circuit is further configured to:
  determine a first partition comprising a first plurality of color channels and a second partition comprising a second plurality of color channels based on the raw image data,
  generate a third bit-plane corresponding to the first plurality of color channels, and
  generate a fourth bit-plane corresponding to the second plurality of color channels.

6. The electronic device of claim 1,
  wherein the bitstream comprises at least one of an image header data field including information related to the raw image data, a partition header field including information related to a partition, or a compressed data field including the compressed data, and
  wherein the at least one processor is configured to decompress the compressed data using at least one of the image header data field, the partition header field, or the compressed data field.

7. The electronic device of claim 1, wherein the control circuit is further configured to:
  divide the raw image data into a plurality of partitions corresponding to the plurality of pixels, respectively,
  generate the plurality of bit-planes using data corresponding to the plurality of pixels included in each partition, and
  divide respective partitions into a plurality of sub-partitions.

8. The electronic device of claim 1, wherein the control circuit is further configured to add at least one bit to a pixel having a pixel value which is equal to or less than a specific value, among the plurality of pixels.

9. A method of compressing image data, the method comprising:
  obtaining raw image data from an image sensor;
  generating a plurality of bit-planes configured based on bit positions of respective pixel values for a plurality of pixels of the raw image data;
  selecting a first number of bit-planes, corresponding to first bits including at least a most significant bit (MSB) among the plurality of bit-planes to satisfy a predetermined compression rate for the raw image data, the plurality of bit-planes including the first number of bit-planes and a second number of bit-planes, corresponding to second bits including at least a least significant bit (LSB),
  identifying whether a position of a lowest bit-plane of the first number of bit-planes is greater than a first threshold value,
  in response to identifying that the position of the lowest bit-plane is greater than the first threshold value, identifying a number of times by which a bit-run is interrupted in each of the first number of bit-planes,
  based on identifying the number of times, determining whether to add at least one bit included in the second number of bit-planes to the first number of bit-planes,
  in response to determining to add the at least one bit to the first number of bit-planes, compressing data including the first number of bit-planes and the at least one bit;
  generating compressed data in which one or more of the plurality of bit-planes are compressed; and
  transmitting a bitstream containing the compressed data to at least one processor.

10. The method of claim 9, wherein the generating of the plurality of bit-planes comprises:
  separating the raw image data obtained from the image sensor into a plurality of color channels comprising a first color channel and a second color channel; and
  generating a first bit-plane corresponding to the first color channel and a second bit-plane corresponding to the second color channel.

11. The method of claim 9, further comprising:
  converting at least some of the raw image data obtained from the image sensor into gray codes; and
  generating the plurality of bit-planes for the raw image data converted into the gray codes.

12. The method of claim 9, further comprising:
  identifying a sum of the number of times,
  determining whether the sum of the number of times is greater than a second threshold value; and
  in response to determining that the sum of the number of times is greater than the second threshold value, determining to add the at least one bit to the first number of bit-planes.

13. The method of claim 9, wherein the generating of the plurality of bit-planes comprises:
  determining a first partition comprising a first plurality of color channels and a second partition comprising a second plurality of color channels based on the raw image data;
  generating a third bit-plane corresponding to the first plurality of color channels; and
  generating a fourth bit-plane corresponding to the second plurality of color channels.

14. The method of claim 9,
  wherein the bitstream comprises at least one of an image header data field including information related to the raw image data, a partition header field including information related to a partition, or a compressed data field including the compressed data, and
  wherein the at least one processor is configured to decompress the compressed data using at least one of the image header data field, the partition header field, or the compressed data field.

15. The method of claim 9, further comprising:
  dividing the raw image data into a plurality of partitions each comprising a plurality of pixels;
  generating the plurality of bit-planes using data corresponding to the plurality of pixels included in each partition; and
  dividing respective partitions into a plurality of sub-partitions.

16. The method of claim 9, further comprising adding at least one bit to a pixel having a pixel value which is equal to or less than a specific value, among the plurality of pixels.

* * * * *